United States Patent
Goto et al.

(10) Patent No.: US 12,168,463 B2
(45) Date of Patent: Dec. 17, 2024

(54) DRIVING ASSISTANCE DEVICE AND RECORDING MEDIUM

(71) Applicant: SUBARU CORPORATION, Tokyo (JP)

(72) Inventors: Ikuo Goto, Tokyo (JP); Daiki Shiwa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 314 days.

(21) Appl. No.: 17/675,740

(22) Filed: Feb. 18, 2022

(65) Prior Publication Data

US 2022/0289251 A1 Sep. 15, 2022

(30) Foreign Application Priority Data

Mar. 12, 2021 (JP) ................. 2021-039948

(51) Int. Cl.
*B60W 60/00* (2020.01)
*B60W 40/09* (2012.01)
*B60W 50/00* (2006.01)

(52) U.S. Cl.
CPC ........ *B60W 60/0059* (2020.02); *B60W 40/09* (2013.01); *B60W 50/00* (2013.01); *B60W 60/0011* (2020.02); *B60W 60/0015* (2020.02); *B60W 2050/0083* (2013.01); *B60W 2540/043* (2020.02); *B60W 2540/223* (2020.02); *B60W 2540/227* (2020.02); *B60W 2540/229* (2020.02); *B60W 2540/30* (2013.01); *B60W 2556/10* (2020.02)

(58) Field of Classification Search
CPC ................................................. B60W 60/0059
See application file for complete search history.

(56) References Cited

U.S. PATENT DOCUMENTS

| | | | |
|---|---|---|---|
| 10,037,036 B2* | 7/2018 | Nilsson .................. | B60W 40/04 |
| 11,188,082 B2* | 11/2021 | Silva ....................... | G06N 20/00 |
| 11,834,077 B2* | 12/2023 | Sadeghi .............. | B60W 30/095 |
| 2021/0309232 A1* | 10/2021 | Goto ..................... | G06V 40/193 |
| 2022/0306153 A1* | 9/2022 | Goto .................. | B60W 60/0011 |
| 2023/0015466 A1* | 1/2023 | Jiralerspong ....... | B60W 40/105 |
| 2023/0084667 A1* | 3/2023 | Honya ............. | G08G 1/096775 |
| | | | 701/301 |

(Continued)

FOREIGN PATENT DOCUMENTS

JP 2009-169535 A 7/2009

*Primary Examiner* — Michael A Berns
(74) *Attorney, Agent, or Firm* — Rimon P.C.

(57) ABSTRACT

A driving assistance device reflects, in autonomous driving control on a vehicle, a driving characteristic of a driver who drives the vehicle learned during manual driving of the vehicle. The driving assistance device includes a storage that stores information on an individual risk potential set for the vehicle by learning a risk sensed by the driver for each of one or more obstacles during the manual driving, a vehicle risk calculator that sets, for the vehicle, a vehicle risk map that reflects the individual risk potential of an occupant of the vehicle during autonomous driving of the vehicle, and a driving condition setter that sets a driving condition for the autonomous driving of the vehicle based on information on the vehicle risk map and information on an obstacle risk map that reflects an obstacle risk potential set for the each of the one or more obstacles.

12 Claims, 14 Drawing Sheets

(56) References Cited

U.S. PATENT DOCUMENTS

2023/0234574 A1\* 7/2023 Funabashi ......... B60W 30/0956
  701/301
2023/0311864 A1\* 10/2023 Iwase ................... B60W 10/10
  701/301

\* cited by examiner

DRIVING ASSISTANCE DEVICE AND RECORDING MEDIUM

CROSS-REFERENCE TO RELATED APPLICATIONS

The present application claims priority from Japanese Patent Application No. 2021-039948 filed on Mar. 12, 2021, the entire contents of which are hereby incorporated by reference.

BACKGROUND

The disclosure relates to a driving assistance device that reflects a driving characteristic of a driver who drives a vehicle in autonomous driving control, and also relates to a recording medium.

In recent years, attempts have been made to achieve practical use of vehicles having a driving assistance function and an autonomous driving function to reduce traffic accidents and driving loads. For example, there is known a device that detects obstacles around a driver's vehicle (a vehicle of a driver of interest) based on information detected by various sensors such as an external environment camera and a light detection and ranging (LiDAR) sensor of the driver's vehicle and assists driving of the driver's vehicle to avoid collision between the driver's vehicle and any obstacle.

For example, Japanese Unexamined Patent Application Publication (JP-A) No. 2009-169535 proposes a driving assistance device that can achieve driving assistance control adapted to actual external environments and driver's feelings. For example, JP-A No. 2009-169535 discloses a driving assistance device that generates a risk potential distribution based on targets recognized ahead of a driver's vehicle and sets a traveling area where the driver's vehicle can travel based on the risk potential distribution to set a traveling area adapted to actual external environments and driver's feelings, thereby achieving appropriate driving assistance control.

SUMMARY

An aspect of the disclosure provides a driving assistance device to be applied to a vehicle. The driving assistance device is configured to reflect, in autonomous driving control on the vehicle, a driving characteristic of a driver who drives the vehicle. The driving characteristic is to be learned during manual driving of the vehicle. The driving assistance device includes a storage, a vehicle risk calculator, and a driving condition setter. The storage is configured to store information on an individual risk potential to be set for the vehicle by learning a risk to be sensed by the driver of the for each of one or more obstacles around the vehicle during the manual driving. The vehicle risk calculator is configured to set, for the vehicle, a vehicle risk map that reflects the individual risk potential of an occupant of the vehicle during autonomous driving of the vehicle. The driving condition setter is configured to set a driving condition for the autonomous driving of the vehicle based on information on the vehicle risk map and information on an obstacle risk map that reflects an obstacle risk potential to be set for the each of one or more obstacles.

An aspect of the disclosure provides a recording medium storing a computer program that causes a processor to execute operations. The operations include reading information on an individual risk potential to be set for a vehicle by learning a risk sensed to be by a driver who drives the vehicle for each of one or more obstacles around the vehicle during manual driving of the vehicle. The operations include setting, for the vehicle, a vehicle risk map that reflects the individual risk potential of an occupant of the vehicle during autonomous driving of the vehicle. The operations include setting a driving condition for the autonomous driving of the vehicle based on information on the vehicle risk map and information on an obstacle risk map that reflects an obstacle risk potential to be set for the each of the one or more obstacles.

An aspect of the disclosure provides a driving assistance device to be applied to a vehicle. The driving assistance device is configured to reflect, in autonomous driving control on the vehicle, a driving characteristic of a driver who drives the vehicle. The driving characteristic is to be learned during manual driving of the vehicle. The driving assistance device includes a storage and circuitry. The storage is configured to store information on an individual risk potential to be set for the vehicle by learning a risk to be sensed by the driver for each of one or more obstacles around the vehicle during the manual driving. The circuitry is configured to set, for the vehicle, a vehicle risk map that reflects the individual risk potential of an occupant of the vehicle during autonomous driving of the vehicle. The circuitry is configured to set a driving condition for the autonomous driving of the vehicle based on information on the vehicle risk map and information on an obstacle risk map that reflects an obstacle risk potential to be set for the each of the one or more obstacles.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
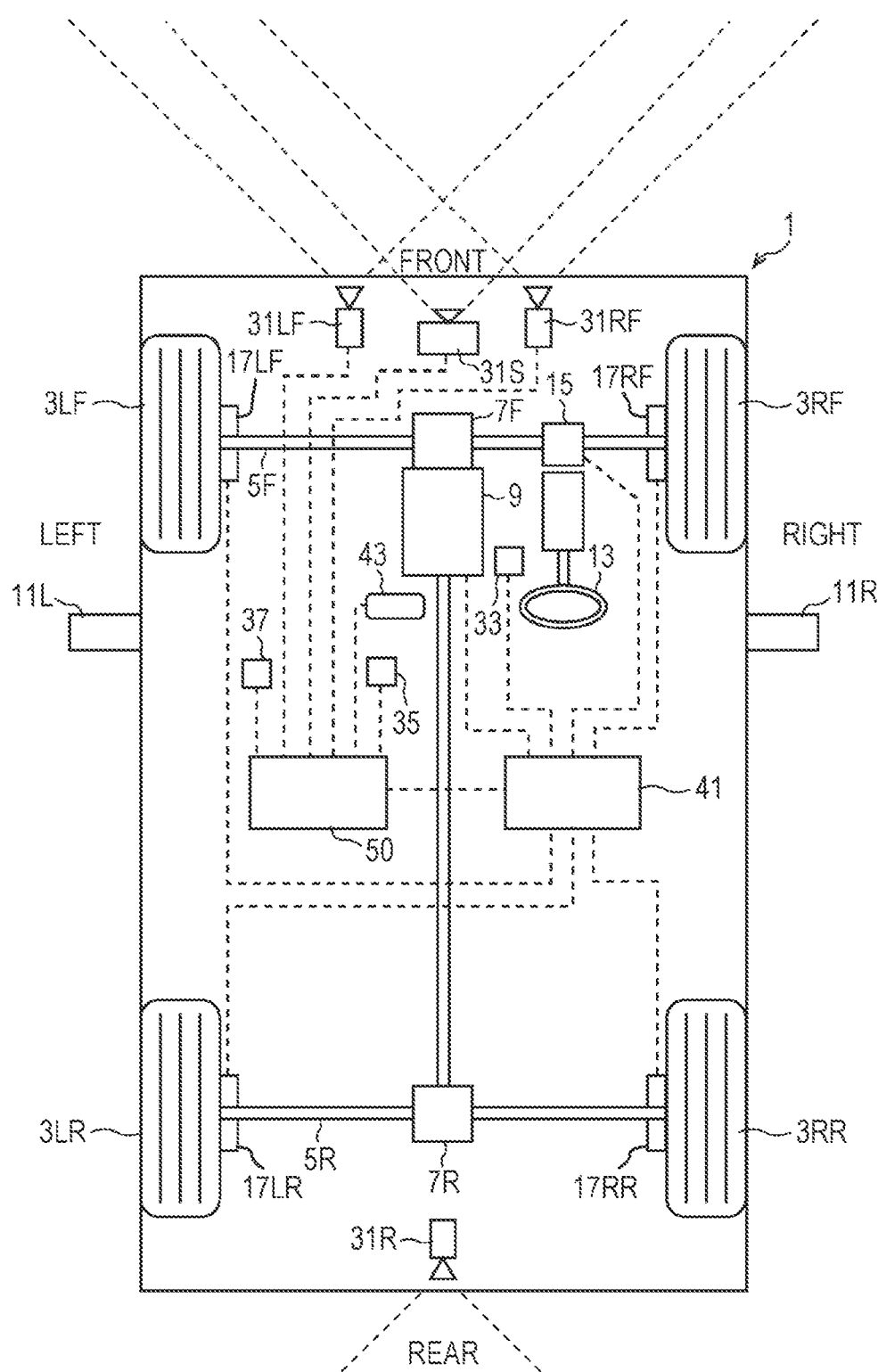
FIG. 1 is a schematic diagram illustrating an example of the configuration of a vehicle including a driving assistance device according to an embodiment of the disclosure.

Although the driving assistance device disclosed in JP-A No. 2009-169535 can achieve the driving assistance control adapted to driver's feelings, the driving assistance control may bring anxiety and discomfort to an occupant other than the driver because of a lack of consideration of feelings of that occupant.

It is desirable to provide a driving assistance device that can set driving conditions to reduce anxiety and discomfort of all occupants during driving assistance control for steering around an obstacle by autonomous driving, and to provide a recording medium.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Elements having substantially the same functions and structures herein and in the drawings are represented by the same reference symbols to omit redundant description.

1. Overall Configuration of Vehicle

Description is made about an example of the overall configuration of a vehicle to which a driving assistance device according to the embodiment of the disclosure is applicable.

FIG. 1 is a schematic diagram illustrating an example of the configuration of a driver's vehicle 1 including a driving assistance device 50.

The driver's vehicle 1 illustrated in FIG. 1 is a four-wheel drive vehicle in which a vehicle drive torque output from a drive source 9 that generates the drive torque is transmitted to a left front wheel 3LF, a right front wheel 3RF, a left rear wheel 3LR, and a right rear wheel 3RR (hereinafter referred to collectively as "wheels 3" unless otherwise distinguished). The drive source 9 may be any one of an internal combustion engine such as a gasoline engine or a diesel engine, a drive motor, and a combination of the internal combustion engine and the drive motor.

Examples of the driver's vehicle 1 include an electric vehicle including two drive motors that are a front wheel drive motor and a rear wheel drive motor, and an electric vehicle including drive motors for the individual wheels 3. When the driver's vehicle 1 is either one of an electric vehicle and a hybrid electric vehicle, the driver's vehicle 1 includes a secondary battery that stores electric power to be supplied to the drive motors, and a generator such as a motor or a fuel cell that generates electric power to be stored in the battery.

The driver's vehicle 1 includes the drive source 9, an electric steering device 15, and braking devices 17LF, 17RF, 17LR, and 17RR (hereinafter referred to collectively as "braking devices 17" unless otherwise distinguished) for use in driving control on the driver's vehicle 1. The drive source 9 outputs the drive torque to be transmitted to a front wheel drive shaft 5F and a rear wheel drive shaft 5R via a transmission (not illustrated), a front wheel differential mechanism 7F, and a rear wheel differential mechanism 7R. Drive of the drive source 9 and the transmission is controlled by a vehicle control device 41 including one or more electronic control units (ECUs).

The electric steering device 15 is provided on the front wheel drive shaft 5F. The electric steering device 15 includes an electric motor and gear mechanisms (not illustrated), and adjusts steering angles of the left front wheel 3LF and the right front wheel 3RF under control of the vehicle control device 41. During manual driving, the vehicle control device 41 controls the electric steering device 15 based on a steering angle of a steering wheel 13 operated by the driver. During autonomous driving, the vehicle control device 41 controls the electric steering device 15 based on a target steering angle set by the driving assistance device 50.

The braking devices 17LF, 17RF, 17LR, and 17RR apply braking forces to the respective driving wheels 3LF, 3RF, 3LR, and 3RR. Examples of the braking device 17 include a hydraulic braking device. A hydraulic pressure to be supplied to the braking device 17 is controlled by the vehicle control device 41 to generate a predetermined braking force. When the driver's vehicle 1 is either one of an electric vehicle and a hybrid electric vehicle, the braking device 17 also serves as a regenerative brake in combination with the drive motor.

The vehicle control device 41 includes one or more electronic control units that control drive of the drive source 9 that outputs the drive torque of the driver's vehicle 1, the electric steering device 15 that controls the steering angle(s) of either one of the steering wheel and the steered wheels, and the braking devices 17 that control the braking force of the driver's vehicle 1. The vehicle control device 41 may have a function of controlling drive of the transmission that changes the speed for power output from the drive source 9 and transmits the power to the wheels 3. The vehicle control device 41 can acquire information from the driving assistance device 50, and execute autonomous driving control on the driver's vehicle 1.

The driver's vehicle 1 includes front view cameras 31LF and 31RF, a rear view camera 31R, a light detection and ranging (LiDAR) sensor 31S, a cabin camera 33, a vehicle condition sensor 35, a global positioning system (GPS) sensor 37, and a human machine interface (HMI) 43.

The front view cameras 31LF and 31RF, the rear view camera 31R, and the LiDAR sensor 31S constitute a surrounding environment sensor that acquires information on a surrounding environment of the driver's vehicle 1. The front view cameras 31LF and 31RF and the rear view camera 31R generate image data by imaging views ahead of and behind the driver's vehicle 1. The front view cameras 31LF and 31RF and the rear view camera 31R include imaging elements such as charge-coupled devices (CCDs) or complementary metal-oxide-semiconductors (CMOSs), and transmit the generated image data to the driving assistance device 50.

In the driver's vehicle 1 illustrated in FIG. 1, the front view cameras 31LF and 31RF serve as a stereo camera including a pair of right and left cameras, and the rear view camera 31R is a so-called monocular camera, but each camera may be either one of the stereo camera and the monocular camera. In addition to the front view cameras 31LF and 31RF and the rear view camera 31R, the driver's vehicle 1 may include, for example, cameras provided on side mirrors 11L and 11R and configured to image left and right rear views.

The LiDAR sensor 31S transmits an optical wave and receives the reflected optical wave to detect an object and a distance to the object based on a period from the transmission of the optical wave to the reception of the reflected wave. The LiDAR sensor 31S transmits detection data to the driving assistance device 50. The driver's vehicle 1 may include one or more sensors out of an ultrasonic sensor and a radar sensor such as a millimeter wave radar as the surrounding environment sensor that acquires information on the surrounding environment.

The cabin camera 33 generates image data by imaging a cabin. The cabin camera 33 includes an imaging element such as a CCD or a CMOS, and transmits the generated image data to the driving assistance device 50. In this embodiment, the cabin camera 33 is positioned to image occupants in the driver's vehicle 1. The number of cabin cameras 33 may be one or plural.

The vehicle condition sensor 35 includes at least one sensor that detects an operating condition and behavior of the driver's vehicle 1. For example, the vehicle condition sensor 35 includes at least one of a steering angle sensor, an accelerator position sensor, a braking stroke sensor, a braking pressure sensor, or an engine speed sensor, and detects an operating condition of the driver's vehicle 1 such as steering angle(s) of either one of the steering wheel and the steered wheels, an accelerator operation amount, a brake operation amount, or an engine speed. For example, the vehicle condition sensor 35 includes at least one of a vehicle speed sensor, an acceleration sensor, or an angular velocity sensor, and detects behavior of the vehicle such as a vehicle speed, a longitudinal acceleration, a lateral acceleration, or a yaw rate. The vehicle condition sensor 35 transmits a sensor signal including the detected information to the driving assistance device 50.

The GPS sensor 37 receives a satellite signal from a GPS satellite. The GPS sensor 37 transmits, to the driving assistance device 50, positional information of the driver's vehicle 1 on map data in the received satellite signal. In place of the GPS sensor 37, an antenna may be provided to receive a satellite signal from another satellite system that determines the position of the driver's vehicle 1.

The HMI 43 is driven by the driving assistance device 50 and presents various types of information to the driver by means of either one of image display and audio output. For example, the HMI 43 includes a display in an instrument panel and a loudspeaker in the vehicle. The display may be a display of a navigation system. The HMI 43 may include a head-up display (HUD) that displays information on a windshield with the information laid over a surrounding view of the driver's vehicle 1.

2. Driving Assistance Device

The driving assistance device 50 according to this embodiment is described in detail.

2-1. Configuration Example

Figure 2:
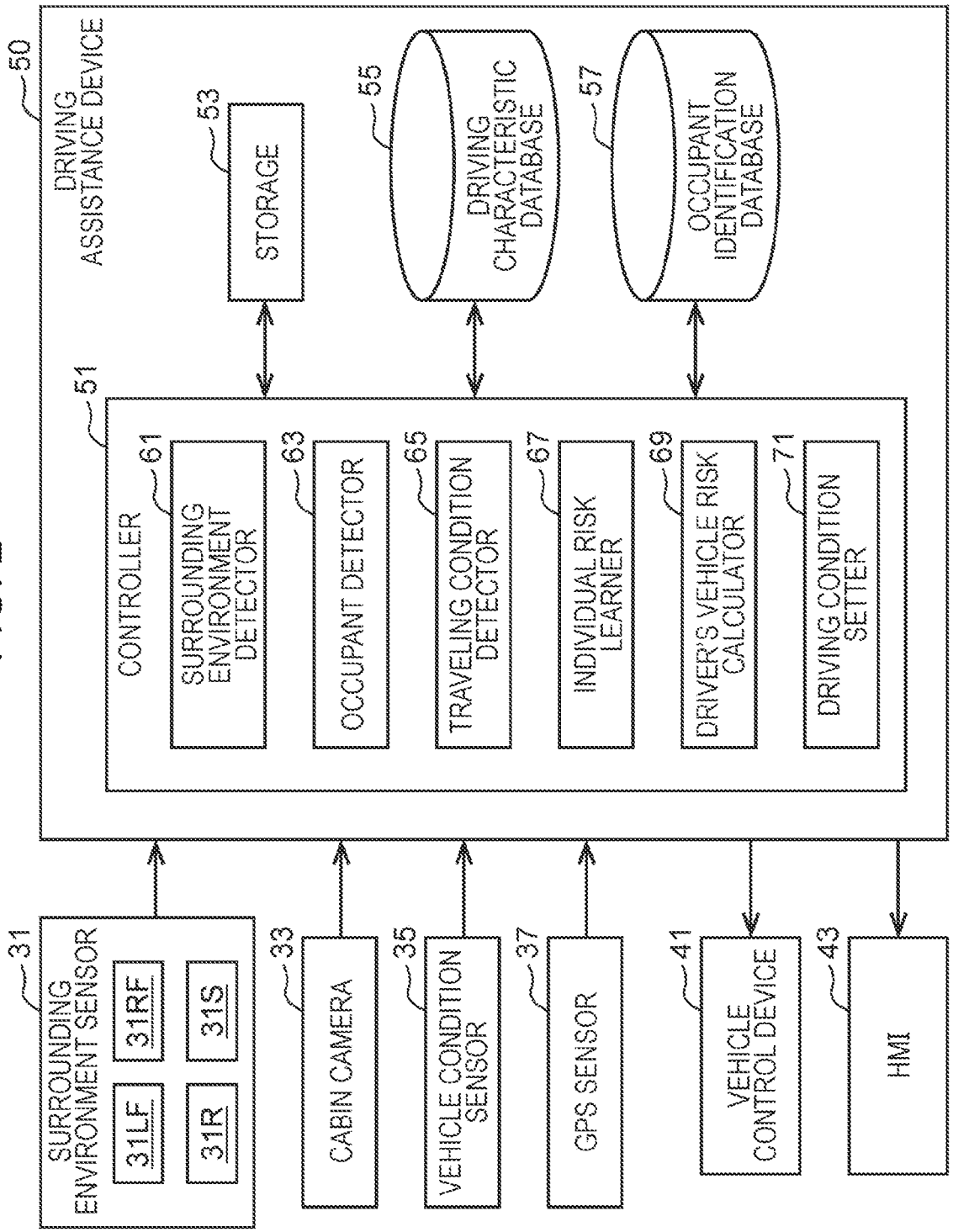
FIG. 2 is a block diagram illustrating an example of the configuration of the driving assistance device according to the embodiment.

FIG. 2 is a block diagram illustrating an example of the configuration of the driving assistance device 50 according to this embodiment.

A surrounding environment sensor 31, the cabin camera 33, the vehicle condition sensor 35, and the GPS sensor 37 are coupled to the driving assistance device 50 directly or via a communicator such as a controller area network (CAN) or a Local Interconnect Network (LIN). The vehicle control device 41 and the HMI 43 are also coupled to the driving assistance device 50. The driving assistance device 50 may be not only an electronic control unit mounted on the driver's vehicle 1, but also a terminal device such as a smartphone or a wearable device.

The driving assistance device 50 includes a controller 51, a storage 53, a driving characteristic database 55, and an occupant identification database 57. The controller 51 includes one or more processors such as a central processing unit (CPU). The controller 51 may partially or entirely be either one of updatable firmware and a program module to be executed by a command from a CPU or the like. The storage 53 includes memories such as a random access memory (RAM) and a read only memory (ROM). The number of storages 53 and the type of the storage 53 are not particularly limited. The storage 53 stores computer programs to be executed by the controller 51, various parameters for use in arithmetic processing, and information such as detection data and calculation results.

The driving characteristic database 55 and the occupant identification database 57 are created by either one of a memory such as a RAM and an updatable recording medium such as a hard disk drive (HDD), a compact disk (CD), a digital versatile disk (DVD), a solid state drive (SSD), a USB flash memory, or a storage device. The type of the recording medium is not particularly limited.

The driving characteristic database 55 stores information on individual risk potentials that reflect driving characteristics of individual drivers that are learned during the manual driving of the driver's vehicle 1. The occupant identification database 57 stores information for identifying occupants of the driver's vehicle 1 (hereinafter referred to also as "occupant identification information"). Examples of the occupant identification information include an identification number and an identification symbol. The occupant identification information is not limited to those examples. The individual risk potential and the occupant identification information are described later in detail.

2-2. Process for Setting Driving Conditions Based on Risk Potential

Prior to detailed description of processes of the driving assistance device 50, description is briefly made about an overview of a process for setting driving conditions based on a risk potential by the driving assistance device 50.

Figure 3:
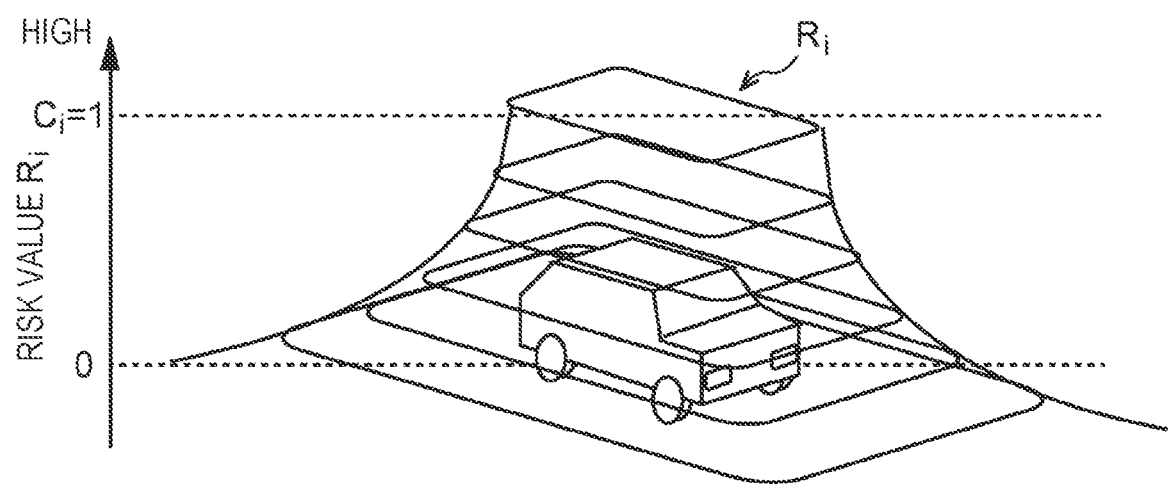
FIG. 3 is an explanatory diagram illustrating an example of an obstacle risk potential.
Figure 4:
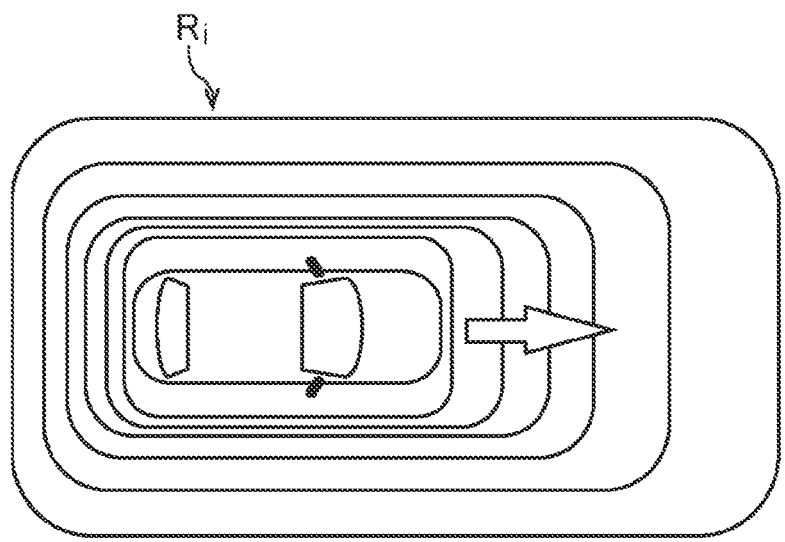
FIG. 4 is another explanatory diagram illustrating the example of the obstacle risk potential.

FIG. 3 and FIG. 4 are explanatory diagrams illustrating a risk potential set for each obstacle (obstacle risk potential). FIG. 3 and FIG. 4 illustrate an example of a risk potential set in the vehicle. A value $R_i$ of the risk potential (risk value) is maximum in an area where an obstacle (vehicle) is present, and decreases with increasing distance from the outer peripheral edge of the obstacle (vehicle). The risk value $R_i$ can be represented by an exponential function for a distance $l_i$ from the obstacle, and is represented by, for example, Expression (1).

$$R_i = C_i \exp\left(-\frac{l_i - r_i}{\sigma_i}\right) \quad (1)$$

$R_i$: risk value
$C_i$: risk absolute value (gain)
$l_i$: distance from obstacle
$\sigma_i$: gradient coefficient
$r_i$: obstacle radius
i: number for distinguishing obstacle In this embodiment, the risk value $R_i$ ranges from "0" to "1". The risk absolute value $C_i$ when the distance $l_i$ from the obstacle is zero is "1", and the vehicle is not travelable in this area. The risk absolute value $C_i$ may be set for each obstacle as a value that depends on the obstacle. For example, when the obstacle is either one of "vehicle" and "low curbstone", the risk of collision with the vehicle is higher than the risk of collision with the low curbstone. Therefore, the risk absolute value $C_i$ of "vehicle" is set larger than the risk absolute value $C_i$ of "low curbstone".

The gradient coefficient $\sigma_i$ is set depending on a type of the obstacle. For example, the gradient coefficient $\sigma_i$ may be set based on either one of a Gaussian function and an exponential function. When the obstacle is a moving object such as a vehicle traveling near the driver's vehicle 1, the risk is higher in a traveling direction of the vehicle. Therefore, as illustrated in FIG. 4, the risk ahead of the vehicle may be set deeper than the risk behind the vehicle. In this case, the depth of the risk ahead of the vehicle may be variable depending on either one of a speed of the vehicle and a relative vehicle speed to the driver's vehicle.

When a traveling trajectory and either one of an acceleration and a deceleration of the driver's vehicle 1 are set by using the risk potential, risk potentials are set for a plurality of obstacles detected during traveling of the driver's vehicle 1, and a spatial overlap of the obstacle risk potentials is added up to obtain an obstacle risk map (potential field) showing risks of collision with the obstacles. Among the risk values of the obstacle risk potentials, the maximum risk value may be set as a risk value of the obstacle risk map at a point of interest. In the obstacle risk map, the risk level is represented by a contour line on a two-dimensional plane. Since the risk values have a two-dimensional distribution, a trajectory with a low risk can be selected. The obstacle risk map may be calculated in consideration of detectable obstacles together with undetectable risks (latent risks). For example, when the vehicle makes a turn to a blind area that is hidden by a fence or the like, a latent risk may be added and reflected in the obstacle risk map in consideration of a possibility that either one of a pedestrian and a vehicle comes out from the blind area.

The driving assistance device 50 according to this embodiment sets a driver's vehicle risk map for the driver's vehicle 1 along with the generation of the obstacle risk map based on the obstacle risk potentials set for the obstacles around the driver's vehicle 1. The driver's vehicle risk map reflects driving characteristics of one or more occupants in the driver's vehicle 1 during the manual driving, and driving conditions can be set to reduce anxiety and discomfort of the occupants.

2-3. Functional Configuration

The driving assistance device 50 learns driving characteristics of individual drivers during the manual driving of the driver's vehicle 1, and sets driving conditions of the vehicle 1 in consideration of driving characteristics of all the occupants of the driver's vehicle 1 during the autonomous driving of the driver's vehicle 1.

As illustrated in FIG. 2, the controller 51 of the driving assistance device 50 includes a surrounding environment detector 61, an occupant detector 63, a traveling condition detector 65, an individual risk learner 67, a driver's vehicle risk calculator 69, and a driving condition setter 71. Those components are functions implemented through execution of computer programs by the processor such as a CPU.

(Surrounding Environment Detector)

The surrounding environment detector 61 detects a surrounding environment of the driver's vehicle 1 based on detection data transmitted from the surrounding environment sensor 31. For example, the surrounding environment detector 61 calculates a type, size (width, height, and depth), and position of an obstacle around the driver's vehicle 1, a distance from the driver's vehicle 1 to the obstacle, and a relative speed between the driver's vehicle 1 and the obstacle. The detected obstacle is another traveling vehicle, a parked vehicle, a pedestrian, a bicycle, a wall, a curbstone, a building, a power pole, a traffic sign, a traffic signal, a natural object, or any other object around the vehicle. The surrounding environment detector 61 may have a lane recognition function for detecting borders or the like on a road. Processes to be executed by the surrounding environment detector 61 are described later in detail.

(Occupant Detector)

The occupant detector 63 executes a process for detecting an occupant of the driver's vehicle 1 based on image data transmitted from the cabin camera 33. For example, during the manual driving of the driver's vehicle 1, the occupant detector 63 extracts occupant identification information of a driver on a driver's seat who is identified based on image data transmitted from the cabin camera 33 from among pieces of occupant identification information stored in the occupant identification database 57, and stores the occupant identification information of the identified driver in the storage 53. When the occupant identification information of the corresponding driver is not stored in the occupant identification database 57, the occupant detector 63 stores the occupant identification information of the detected driver together with his/her data in the occupant identification database 57.

During the autonomous driving of the driver's vehicle 1, the occupant detector 63 extracts occupant identification information of each occupant identified based on image data transmitted from the cabin camera 33 from among the pieces of occupant identification information stored in the occupant identification database 57, and stores the occupant identification information of each occupant together with information on a sitting position in the storage 53. In this embodiment, during the autonomous driving of the driver's vehicle 1, the occupant detector 63 detects a line-of-sight direction of the occupant in every predetermined calculation period based on image data transmitted from the cabin camera 33. The occupant detector 63 may detect a face direction instead of the line-of-sight direction. Processes to be executed by the occupant detector 63 are described later in detail.

(Traveling Condition Detector)

The traveling condition detector 65 detects information on an operating condition and behavior of the driver's vehicle 1 based on detection data transmitted from the vehicle condition sensor 35. The traveling condition detector 65 acquires, in every predetermined calculation period, information on the operating condition of the vehicle 1 such as steering angle(s) of either one of the steering wheel and the steered wheels, an accelerator operation amount, a brake operation amount, or an engine speed and information on the behavior of the vehicle such as a vehicle speed, a longitudinal acceleration, a lateral acceleration, or a yaw rate, and stores those pieces of information in the storage 53.

(Individual Risk Learner)

During the manual driving of the driver's vehicle 1, the individual risk learner 67 learns a risk of an obstacle for a driver, and calculates an individual risk potential. The individual risk potential is data obtained by learning a risk of an obstacle (sense of danger of collision) sensed by a driver based on a distance from the outer peripheral edge of the driver's vehicle 1. The individual risk potential is learned based on data on a distance between the driver's vehicle 1 and the obstacle that is acquired during the manual driving, and is set in the driver's vehicle 1. In this embodiment, the individual risk learner 67 learns, for each driver, a parameter that defines the individual risk potential set in the driver's vehicle 1 (hereinafter referred to also as "individual risk potential parameter"), and stores the individual risk potential parameter in the driving characteristic database 55 in association with occupant identification information of the driver.

In this embodiment, either one of the magnitude of a risk value and the width of a setting range of the individual risk potential in an area around the area where the driver's vehicle 1 is present is corrected based on the vehicle speed. During the manual driving of the driver's vehicle 1, the individual risk learner 67 calculates an overlapping area risk that is a risk value of an overlapping area between the learned individual risk potential and an obstacle risk map generated by an overlap of obstacle risk potentials set for obstacles around the driver's vehicle 1. The individual risk learner 67 learns a relationship between the overlapping area risk and the vehicle speed for each driver. Thus, the individual risk learner 67 learns a target level of the overlapping area risk reduced by each driver through deceleration. The level of the overlapping area risk reduced by each driver is hereinafter referred to as "individual overlapping area risk threshold". The individual risk learner 67 stores the learned individual overlapping area risk threshold in the driving characteristic database 55 in association with the occupant identification information of the driver. Processes to be executed by the individual risk learner 67 are described later in detail.

(Driver's Vehicle Risk Calculator)

During the autonomous driving of the driver's vehicle 1, the driver's vehicle risk calculator 69 sets, for the driver's vehicle 1, a driver's vehicle risk map that reflects an individual risk potential of an occupant of the driver's vehicle 1. For example, during the autonomous driving of the driver's vehicle 1, the driver's vehicle risk calculator 69 extracts information on the individual risk potential associated with an occupant identification number stored in the storage 53 from among pieces of information on individual risk potentials stored in the driving characteristic database 55. The driver's vehicle risk calculator 69 sets the driver's vehicle risk map by using the extracted information on the individual risk potential. Processes to be executed by the driver's vehicle risk calculator 69 are described later in detail.

(Driving Condition Setter)

During the autonomous driving of the driver's vehicle 1, the driving condition setter 71 sets driving conditions of the driver's vehicle 1 based on information on the obstacle risk map that reflects the obstacle risk potentials set for the obstacles around the driver's vehicle 1 and information on the driver's vehicle risk map set by the driver's vehicle risk calculator 69. For example, during the autonomous driving of the driver's vehicle 1, the driving condition setter 71 sets the obstacle risk potentials for the obstacles detected by the surrounding environment detector 61, and generates the obstacle risk map by an overlap of all the obstacle risk potentials.

The driving condition setter 71 extracts all the pieces of information on the individual risk potentials associated with the pieces of occupant identification information of the occupants of the driver's vehicle 1 that are stored in the storage 53, and generates the driver's vehicle risk map. The driving condition setter 71 may correct the individual risk potentials based on sitting positions of the occupants. In this embodiment, the driving condition setter 71 extracts all the individual overlapping area risk thresholds associated with the pieces of occupant identification information of the occupants of the driver's vehicle 1 that are stored in the storage 53, and sets an overlapping area risk threshold for use in the process for setting the driving conditions.

The driving condition setter 71 sets expected traveling trajectories of the driver's vehicle 1, calculates an overlapping area risk of an overlapping area between the generated obstacle risk map and the generated driver's vehicle risk map, and sets, as a target trajectory of the driver's vehicle 1, an expected traveling trajectory on which the overlapping area risk is minimum. In this embodiment, the driving condition setter 71 sets a target vehicle speed of the driver's vehicle 1 so that the overlapping area risk becomes equal to or lower than the overlapping area risk threshold. The driving condition setter sets a target steering angle and either one of a target acceleration and a target deceleration based on information on the set target trajectory and information on the set target vehicle speed, and transmits those pieces of information to the vehicle control device 41. The vehicle control device 41 that has received the information on the set driving conditions controls drive of each control device based on the received information. Processes to be executed by the driving condition setter 71 are described later in detail.

3. Operations of Driving Assistance Device

Examples of operations of the driving assistance device 50 according to this embodiment are described in detail. The examples of the operations of the driving assistance device 50 are described in separate parts for processes in a learning phase during the manual driving and processes in an execution phase during the autonomous driving.

3-1. Processes in Learning Phase

Figure 5:
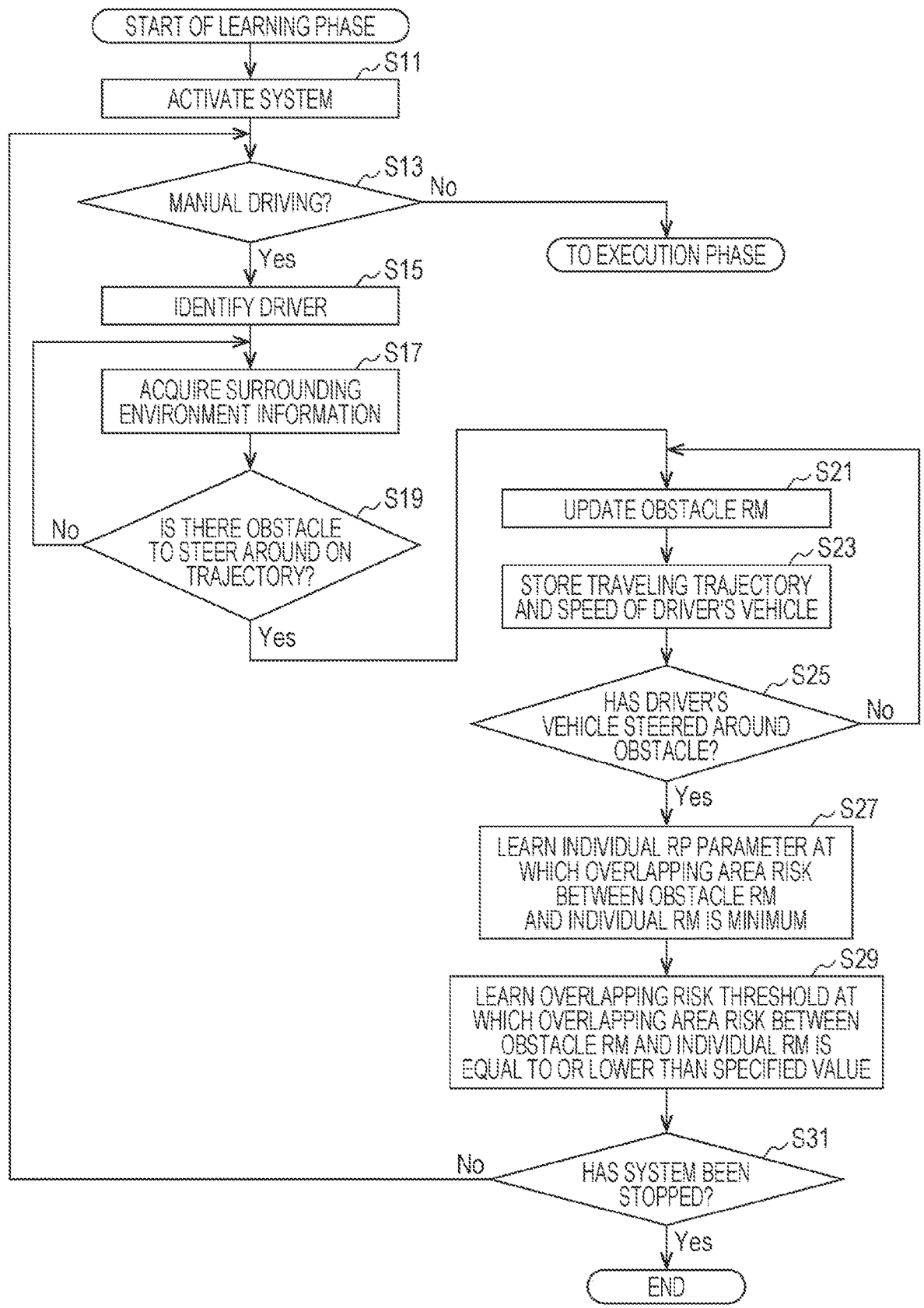
FIG. 5 is a flowchart illustrating processes in a learning phase by the driving assistance device according to the embodiment.

FIG. 5 is a flowchart illustrating an example of the processes in the learning phase.

When an on-board system including the driving assistance device 50 is activated (Step S11), the individual risk learner 67 of the controller 51 determines whether the manual driving is being performed in the driver's vehicle 1 (Step S13). For example, the individual risk learner 67 determines whether a switch of driving modes is set to a manual driving mode. For example, the driving mode is switched based on an input of operation by an occupant of the driver's vehicle 1. When the manual driving is not being performed in the driver's vehicle 1 (S13: No), the controller 51 proceeds to the processes in the execution phase.

When the manual driving is being performed in the driver's vehicle 1 (S13: Yes), the occupant detector 63 of the controller 51 executes a process for identifying a driver (Step S15). For example, the occupant detector 63 executes a facial recognition process by using image data transmitted from the cabin camera 33, and detects an occupant on the driver's seat. The occupant detector 63 extracts a feature amount of the face of the occupant on the driver's seat, and identifies the corresponding occupant by referring to data on feature amounts accumulated in the occupant identification database 57. The occupant detector 63 stores the identified occupant identification information in the storage 53. When the data on the corresponding occupant is not stored in the occupant identification database 57, the occupant detector 63 stores data on the extracted feature amount of the face and the occupant identification information in the occupant identification database 57.

The surrounding environment detector 61 of the controller 51 acquires surrounding environment information of the driver's vehicle 1 (Step S17). For example, the surrounding environment detector 61 detects an obstacle around the driver's vehicle 1 based on detection data transmitted from the surrounding environment sensor 31. The surrounding environment detector 61 calculates a position, type, and size (width, height, and depth) of the detected obstacle, a distance from the driver's vehicle 1 to the obstacle, and a relative speed between the driver's vehicle 1 and the obstacle. The detected obstacle is another traveling vehicle, a parked vehicle, a pedestrian, a bicycle, a wall, a curbstone, a building, a power pole, a traffic sign, a traffic signal, a natural object, or any other object around the vehicle.

For example, the surrounding environment detector 61 processes image data transmitted from the front view cameras 31LF and 31RF to detect the obstacle ahead of the driver's vehicle 1 and the type of the obstacle by pattern matching. The surrounding environment detector 61 calculates the position and size of the obstacle viewed from the driver's vehicle 1 and the distance to the obstacle based on the position of the obstacle in the image data, the size of the obstacle that occupies the image data, and information on parallax of the front view cameras 31LF and 31RF. The surrounding environment detector 61 calculates the relative speed between the driver's vehicle 1 and the obstacle by determining a time derivative of a change in the distance.

The surrounding environment detector 61 may detect the obstacle based on detection data transmitted from the LiDAR sensor 31S. For example, the surrounding environment detector 61 may calculate the position, type, and size of the obstacle and the distance from the driver's vehicle 1 to the obstacle based on information on a period from transmission of an electromagnetic wave from the LiDAR sensor 31S to reception of the reflected wave, a reception direction of the reflected wave, and a range of a measurement point cloud of the reflected wave. The surrounding environment detector 61 may calculate the relative speed between the driver's vehicle 1 and the obstacle by determining a time derivative of a change in the distance.

The surrounding environment detector 61 may acquire information on the obstacle ahead of the driver's vehicle 1 based on information on the position of the driver's vehicle 1 on map data acquired via the GPS sensor 37 and obstacle positional information acquired via an external communicator. The surrounding environment detector 61 stores the acquired surrounding environment information in the storage 53.

The individual risk learner 67 of the controller 51 determines whether an obstacle to steer around is present on a traveling trajectory of the driver's vehicle 1 based on the surrounding environment information acquired by the surrounding environment detector 61 (Step S19). For example, when the driver's vehicle 1 is traveling along a traveling trajectory determined based on information on a speed, either one of an acceleration and a deceleration, and a steering angle of the driver's vehicle 1 that are detected by the traveling condition detector 65, the individual risk learner 67 determines whether the obstacle is present in an area within a preset distance range from the driver's vehicle 1. When determination is made that the obstacle to steer around is not present on the traveling trajectory of the driver's vehicle 1 (S19: No), the controller 51 returns to Step S17 to repeat the processes for detecting the surrounding environment information and determining the presence or absence of the obstacle.

When determination is made that the obstacle to steer around is present on the traveling trajectory of the driver's vehicle 1 (S19: Yes), the individual risk learner 67 updates an obstacle risk map (Step S21). For example, the individual risk learner 67 sets an obstacle risk potential of each obstacle based on the type, size, and relative speed of the obstacle. In this embodiment, the risk value ranges from "0" to "1". The risk value of an area where the obstacle is present is "1", and the vehicle is not travelable in this area. The risk value gradually decreases with increasing distance from the outer peripheral edge of the area where the obstacle is present. For example, the gradient of decrease in the risk value may be set based on either one of a Gaussian function and an exponential function.

The individual risk learner 67 generates the obstacle risk map by an overlap of the obstacle risk potentials set for the obstacles. The individual risk learner 67 sets the obstacle risk potentials for the obstacles, and adds up the risk values at each position in an overlapping area of the obstacle risk potentials of different obstacles, thereby generating the obstacle risk map showing a risk value distribution around the driver's vehicle 1. When adding up the overlap of the obstacle risk potentials, the maximum risk value among the risk values of the obstacle risk potentials at a certain point on a two-dimensional plane may be set as the risk value of the obstacle risk map at that point. When there is one obstacle, the obstacle risk map is generated based on the obstacle risk potential of this obstacle. In the obstacle risk map, the risk level is represented by a contour line on the two-dimensional plane.

The individual risk learner 67 stores data on the traveling trajectory and the vehicle speed of the driver's vehicle 1 in the storage 53 (Step S23). The traveling trajectory of the driver's vehicle 1 can be represented by a group of points of positions of the driver's vehicle 1 plotted on the generated obstacle risk map. The vehicle speed is detected by the traveling condition detector 65.

The individual risk learner 67 determines whether the driver's vehicle 1 has steered around the obstacle on the traveling trajectory (Step S25). For example, the individual risk learner 67 determines that the driver's vehicle 1 has steered around the obstacle when the obstacle recognized in Step S19 is no longer detected by the surrounding environment detector 61. When determination is made that the driver's vehicle 1 has not steered around the obstacle on the traveling trajectory (S25: No), the driver's vehicle risk calculator 69 returns to Step S21 to repeat the processes for updating the obstacle risk map in conjunction with the traveling of the driver's vehicle 1 and storing the data on the traveling trajectory and the vehicle speed of the driver's vehicle 1.

When determination is made that the driver's vehicle 1 has steered around the obstacle on the traveling trajectory (S25: Yes), the individual risk learner 67 learns an individual risk potential parameter (Step S27). In this embodiment, the individual risk learner 67 learns, as the individual risk potential parameter, gradient coefficients $\sigma_x$ and $\sigma_y$ that define the individual risk potential. The individual risk learner 67 learns an individual overlapping area risk threshold in a case of reducing an overlapping area risk through deceleration when the driver steers around the obstacle (Step S29).

The individual risk learner 67 calculates the individual risk potential parameter and the individual overlapping area risk threshold based on the data in the storage 53 about the obstacle and about the traveling trajectory and the vehicle speed of the driver's vehicle 1 set until completion of steering around the obstacle. The processes for learning the individual risk potential parameter and the individual overlapping area risk threshold by the individual risk learner 67 according to this embodiment are described in detail.

The driver senses a risk of collision depending on a distance from the outer peripheral edge of the driver's vehicle 1 to the obstacle. In the individual risk potential of this embodiment, the value of the risk of collision to be sensed by the driver depending on the distance from the outer peripheral edge of the driver's vehicle 1 to the obstacle ranges from "0" to "1" similarly to the obstacle risk potential illustrated in FIG. 3. The individual risk potential can be represented by a function in which the risk value of an area where the driver's vehicle 1 is present is and the risk value gradually decreases with increasing distance from the outer peripheral edge of this area.

Figure 6:
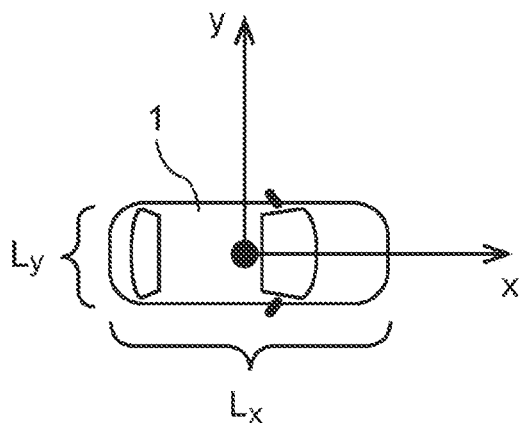
FIG. 6 is an explanatory diagram illustrating a coordinate system to be used when setting risk potentials and risk maps.

As illustrated in FIG. 6, in a two-dimensional coordinate system in which an x-axis is a longitudinal direction of the driver's vehicle 1 and a y-axis is a width direction of the driver's vehicle 1, $L_x$ represents a length of the driver's vehicle 1, $L_y$ represents a width of the driver's vehicle 1, $\sigma_x$ represents a gradient coefficient in the x-axis direction, and $\sigma_y$ represents a gradient coefficient in the y-axis direction. Then, a risk value $R_e$ of an individual risk potential RP e can be represented by Expressions (2) to (5).
(Area where driver's vehicle 1 is present)

$$R_e(x, y) = 1 \cap |x| \le \frac{L_x}{2} \text{ and } |y| \le \frac{L_y}{2} \tag{2}$$

(Area within range of vehicle width $L_y$ and outside range of vehicle length $L_x$)

$$R_e(x, y) = \exp\left(\frac{L_x - 2|x|}{2\sigma_x}\right) \cap |y| \le \frac{L_y}{2} \tag{3}$$

(Area within range of vehicle length $L_x$ and outside range of vehicle width $L_y$)

$$R_e(x, y) = \exp\left(\frac{L_y - 2|y|}{2\sigma_y}\right) \cap |x| \le \frac{L_x}{2} \tag{4}$$

(Area outside range of vehicle length $L_x$ and outside range of vehicle width $L_y$)

$$R_e(x, y) = \exp\left(\frac{L_x - 2|x|}{2\sigma_x} + \frac{L_y - 2|y|}{2\sigma_y}\right) \tag{5}$$

The gradient coefficients $\sigma_x$ and $\sigma_y$ of the individual risk potential RP e represented by Expressions (2) to (5) are parameters that define the individual risk potential RP_e. By adjusting the gradient coefficients $\sigma_x$ and $\sigma_y$, the individual risk potential RP e can be adapted to the driving characteristic of each driver. The gradient coefficients $\sigma_x$ and $\sigma_y$ may be calculated for the front (x>0) and the rear (x<0) of the driver's vehicle 1 and for the left (y>0) and the right (y<0) of the driver's vehicle 1, respectively.

Figure 7:
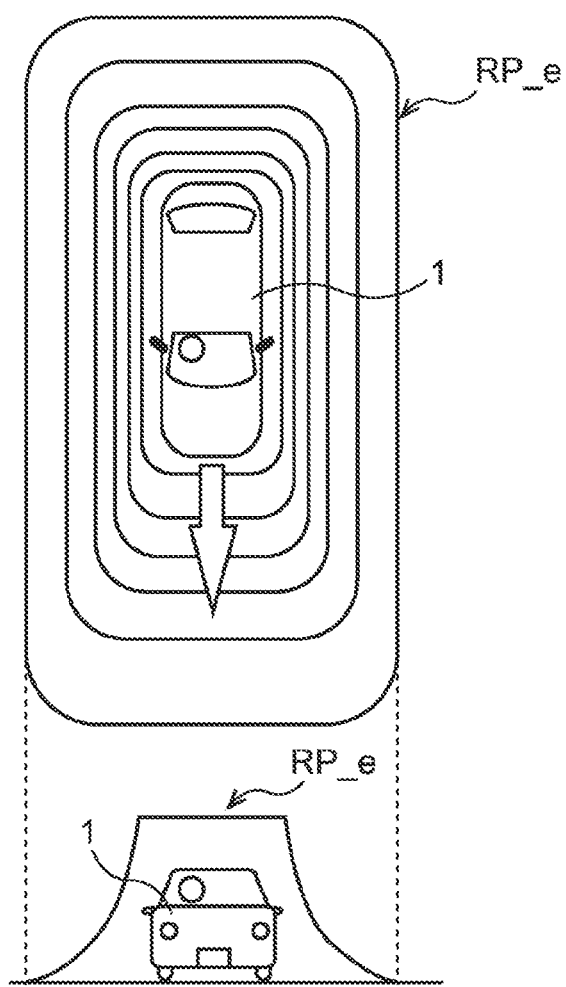
FIG. 7 is an explanatory diagram illustrating an example of an individual risk potential.

FIG. 7 illustrates an example of the individual risk potential RP_e set for the driver's vehicle 1. When the driver's vehicle 1 is traveling, the risk is higher in the traveling direction. Therefore, the anisotropy of the individual risk potential RP_e is represented by setting the risk potential ahead of the driver's vehicle 1 to be deeper than the risk potential behind the driver's vehicle 1. For example, the depth of the risk potential can be adjusted by setting values of the gradient coefficient $\sigma_x$ for an area ahead of the driver's vehicle 1 (positive direction on the x-axis) and for an area behind the driver's vehicle 1 (negative direction on the x-axis). In this case, the depth of the risk potential ahead of the driver's vehicle 1 may be variable depending on either one of the speed of the driver's vehicle 1 and the relative vehicle speed between the driver's vehicle 1 and the obstacle. Alternatively, the anisotropy of the individual risk potential RP_e may be represented by shifting the central point of the coordinate system in FIG. 6 by distances $x_c$ and $y_c$ in the x-axis direction and the y-axis direction.

Figure 8:
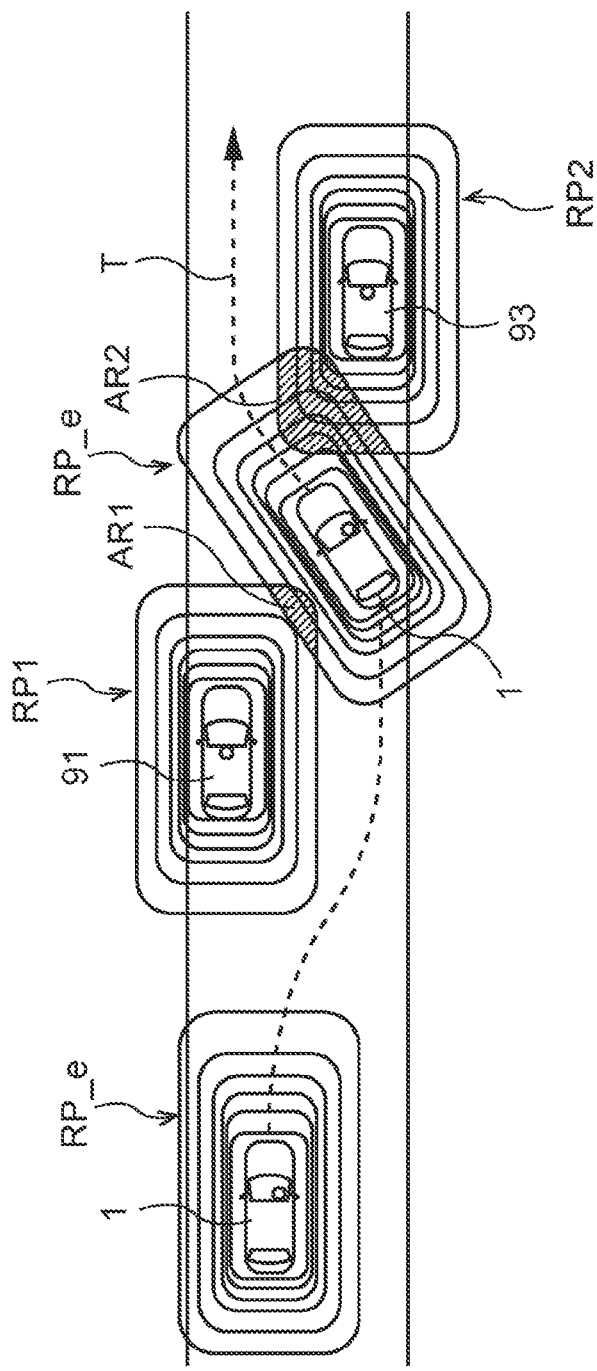
FIG. 8 is an explanatory diagram illustrating an overlapping area risk between an obstacle risk map and a driver's vehicle risk map.

As illustrated in FIG. 8, it is assumed that the driver's vehicle 1 travels in an environment where two first and second parked vehicles 91 and 93 are present ahead of the driver's vehicle 1. The first parked vehicle 91 is parked at the left edge of a road. The second parked vehicle 93 is parked at the right edge of the road. The first parked vehicle 91 is parked behind the second parked vehicle 93. In this environment, the driver can select various traveling trajectories so that the driver's vehicle 1 travels to avoid collision with the first parked vehicle 91 and the second parked vehicle 93. When the driver travels in a certain environment, the vehicle speed and the traveling trajectory are determined while comparing a collision risk from the obstacle (obstacle risk potential) and a collision risk depending on the distance from the outer peripheral edge of the driver's vehicle 1 (individual risk potential). That is, in the certain environment, the driver may select a traveling trajectory on which the overlapping area risk is minimum for the driver.

For example, the individual risk learner 67 sets obstacle risk potentials RP1 and RP2 for the first parked vehicle 91 and the second parked vehicle 93, respectively, and sets the individual risk potential RP_e for the driver's vehicle 1. An overlapping area risk RC of overlapping areas AR1 and AR2 between the individual risk potential RP_e and the obstacle risk potentials RP1 and RP2 in a period until the driver's vehicle 1 traveling along a traveling trajectory T completes steering around the first parked vehicle 91 and the second parked vehicle 93 can be represented by Expression (6).

$$RC = \sum_{tk}^{T_p} \sum_{m}^{n} \sum_{i} \sum_{j} R_e(X_i(t_k), Y_j(t_k)) \times R_m(X_i(t_k), Y_j(t_k)) \qquad (6)$$

$T_p$: period corresponding to depth in traveling direction for calculation of trajectory
$t_k$: time for each data sampling period (t=0 to $T_p$)
n: number of overlapping areas to consider ("2" in this example: AR1 and AR2)
m: integer of 1 to n
$X_i$, $Y_j$: coordinate points in overlapping area ARm at time $t_k$ That is, the overlapping area risk RC is the total of the products of the risk value $R_e$ of the individual risk potential RP_e and a risk value $R_m$ of an obstacle risk potential RPm at the coordinate points $X_i$ and $Y_j$ in the overlapping areas AR1 and AR2.

In the environment illustrated in FIG. 8, it is assumed that the traveling trajectory of the driver's vehicle 1 driven by the driver is set to a traveling trajectory on which the overlapping area risk RC calculated based on Expression (6) is minimum (coordinate point groups $x_{mr}(t_k)$ and $y_{mr}(t_k)$). The individual risk learner 67 acquires data on a trajectory (coordinate points $X_i$ and $Y_j$) at each time $t_k$ in the storage 53, and calculates a risk value $R_e$ at which the overlapping area risk RC is minimum. For example, the individual risk learner 67 sets, by a least square method, gradient coefficients $\sigma_x$ and $\sigma_y$ of the individual risk potential RP_e at which the overlapping area risk RC is minimum. In this manner, the individual risk learner 67 learns the gradient coefficients $\sigma_x$ and $\sigma_y$ that define the individual risk potential RP_e for each driver.

Figure 9:
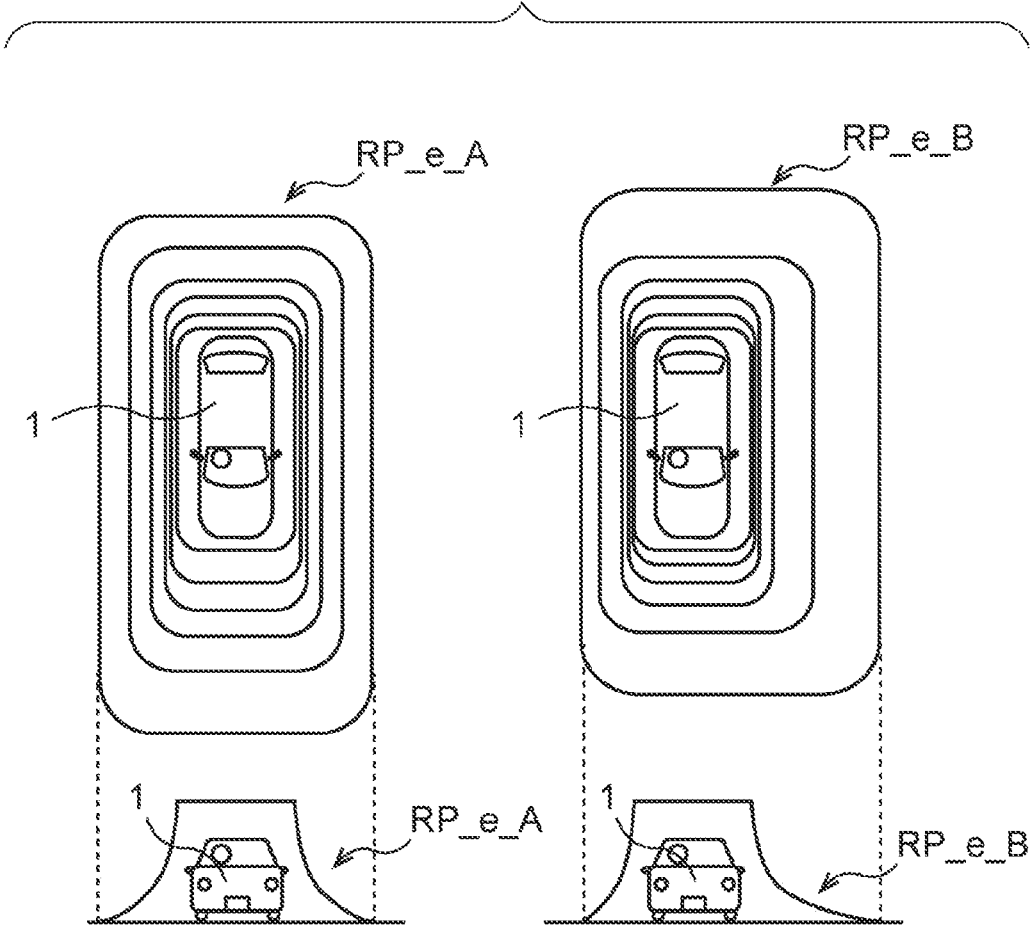
FIG. 9 is an explanatory diagram illustrating an example of individual risk potentials of drivers different in gradient coefficients.

FIG. 9 illustrates an example of individual risk potentials RP_e of drivers A and B different in the gradient coefficients $\sigma_x$ and $\sigma_y$. In the environment illustrated in FIG. 8, the driver A passes between the first parked vehicle 91 and the second parked vehicle 93 while securing substantially equal distances on the right and left of the driver's vehicle 1. The driver B passes between the first parked vehicle 91 and the second parked vehicle 93 while securing a longer distance from the first parked vehicle 91 on the passenger's seat side (left side) than a distance from the second parked vehicle 93 the driver's seat side. In this case, right and left gradients of an individual risk potential RP_e_A that reflects a driving characteristic of the driver A are equal to each other. A left gradient of an individual risk potential RP_e_B that reflects a driving characteristic of the driver B is gentler than a right gradient.

The longitudinal gradients of the individual risk potential may also change by influence of the traveling trajectory. For example, when the driver A starts to steer around the obstacle ahead of the driver's vehicle 1 at a point back from a point where the driver B starts to steer, there is a possibility that the driver A recognizes the occurrence of the overlapping area risk RC at the point where the driver A starts to steer but the driver B does not recognize the occurrence of the overlapping area risk RC at that point. In this case, a front gradient of the individual risk potential RP_e_A that reflects the driving characteristic of the driver A is gentler than a front gradient of the individual risk potential RP_e_B that reflects the driving characteristic of the driver B.

In a case where there is a section where the yaw rate value stored in the storage 53 is larger than a preset threshold when setting the gradient coefficients $\sigma_x$ and $\sigma_y$ of the individual risk potential RP_e for each driver, the individual risk learner 67 may correct data on the traveling trajectory stored in the storage 53 so that the yaw rate value becomes smaller than the threshold. Thus, the traveling trajectory can be set within the permissible range of the threshold of the yaw rate.

In this embodiment, when the driver's vehicle 1 accelerates or decelerates on the traveling trajectory, the individual risk potential RP_e changes depending on the speed. For example, the change in the individual risk potential RP_e that is caused by either one of acceleration and deceleration of the driver's vehicle 1 during the manual driving can be represented by Expression (7).

$$R_e(x, y, v_{mr}) = R_e(x, y)\exp\left(\frac{v_0}{v_{mr}}\right) \qquad (7)$$

$V_{mr}$: vehicle speed after either one of acceleration and deceleration
$v_0$: reference speed (any value)

When the driver's vehicle 1 accelerates, the range of the individual risk potential RP_e is expanded based on Expression (7), and the ranges of the overlapping areas AR1 and AR2 are expanded. When the driver's vehicle 1 decelerates, the range of the individual risk potential RP_e is contracted based on Expression (7), and the ranges of the overlapping areas AR1 and AR2 are contracted. Along with those changes, the number of coordinate points in the overlapping areas AR1 and AR2 changes and the overlapping area risk RC increases or decreases.

The individual risk learner 67 learns a relationship between the vehicle speed v and the overlapping area risk RC at each time $t_k$ under the assumption that the vehicle speed of the driver's vehicle 1 driven by the driver is set based on Expression (7) in the environment illustrated in FIG. 8. Thus, the individual risk learner 67 learns an individual overlapping area risk threshold RC_thr_e when each driver reduces the overlapping area risk RC through deceleration.

In this case, it is assumed that the deceleration of the driver's vehicle 1 is set based on Expressions (6) and (7) depending on the magnitude of a difference between the overlapping area risk RC and the individual overlapping area risk threshold RC_thr_e.

In the manner described above, the individual risk learner 67 learns the individual overlapping area risk threshold RC_thr_e and the gradient coefficients $\sigma_x$ and $\sigma_y$ that define the individual risk potential RP_e of each driver during the manual driving of the driver's vehicle 1, and stores the individual overlapping area risk threshold RC_thr_e and the gradient coefficients $\sigma_x$ and $\sigma_y$ in the driving characteristic database 55 in association with the occupant identification information of the driver (Steps S27 and S29).

The individual risk learner 67 determines whether the on-board system has been stopped (Step S31). When the on-board system has been stopped (S31: Yes), the learning process by the controller 51 is terminated. When the on-board system has not been stopped (S31: No), the controller 51 returns to Step S13 to repeat the processes of the steps described above.

As described above, during the manual driving of the driver's vehicle 1, the controller 51 learns the individual overlapping area risk threshold RC_thr_e and the gradient coefficients $\sigma_x$ and $\sigma_y$ that define the individual risk potential RP_e of each driver based on the data on the traveling trajectory and the vehicle speed when the driver steers around the obstacle. The controller 51 stores the learned gradient coefficients $\sigma_x$ and $\sigma_y$ and the learned individual overlapping area risk threshold RC_thr_e in the driving characteristic database 55 in association with the occupant identification information of the driver. Thus, it is possible to learn the collision risk sensed by each driver depending on the distance from the outer peripheral edge of the driver's vehicle 1.

3-2. Processes in Execution Phase

Figure 10:
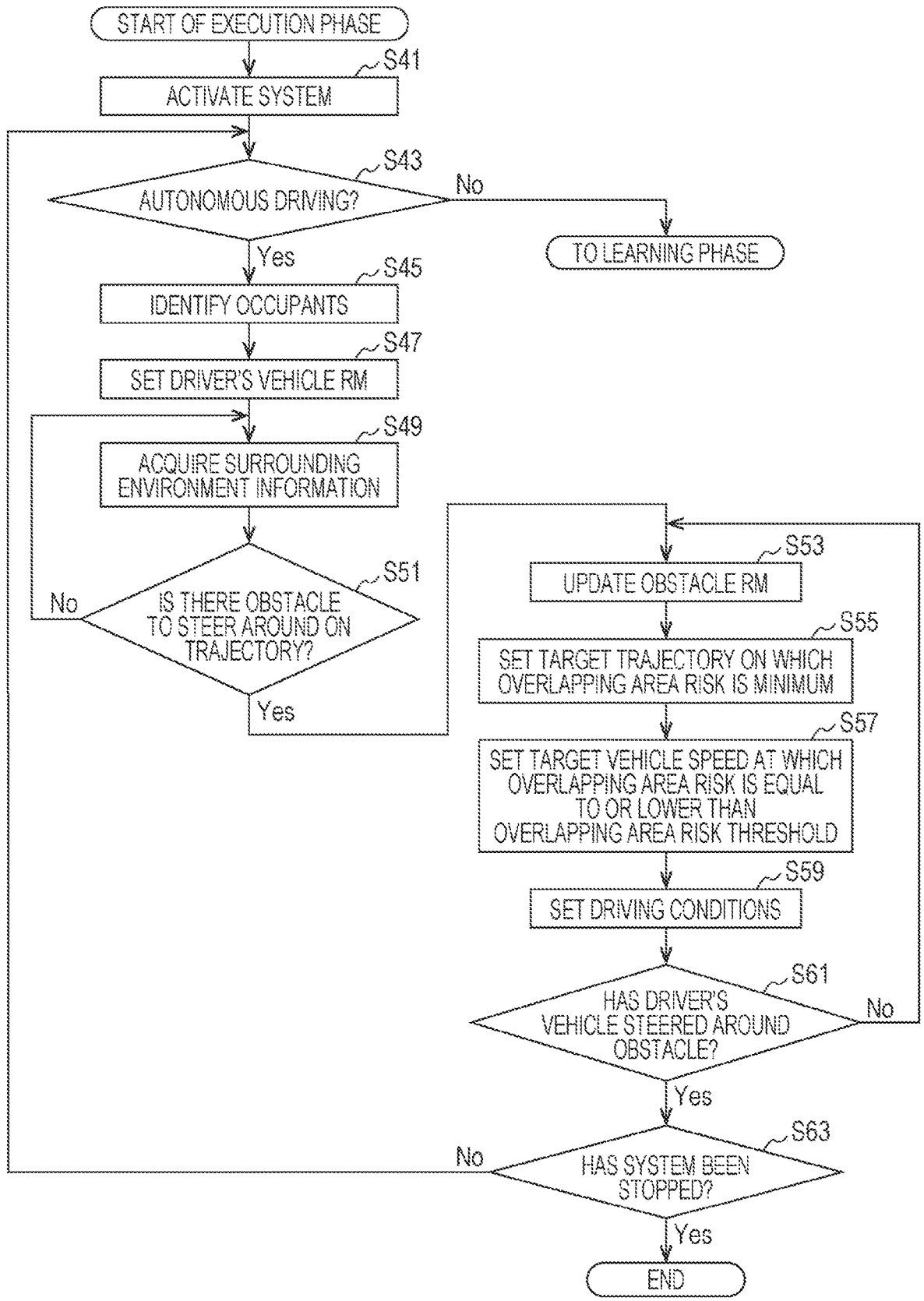
FIG. 10 is a flowchart illustrating processes in an execution phase by the driving assistance device according to the embodiment.

FIG. 10 is a flowchart illustrating an example of the processes in the execution phase.

When the on-board system including the driving assistance device 50 is activated (Step S41), the driving condition setter 71 determines whether the autonomous driving is being performed in the driver's vehicle 1 similarly to the process of Step S13 (Step S43). When the autonomous driving is not being performed in the driver's vehicle 1 (S43: No), the controller 51 proceeds to the processes in the learning phase.

When the autonomous driving is being performed in the driver's vehicle 1 (S43: Yes), the occupant detector 63 executes a process for identifying occupants (Step S45). For example, the occupant detector 63 executes a facial recognition process by using image data transmitted from the cabin camera 33, and detects occupants of the driver's vehicle 1 and sitting positions of the occupants. The sitting position can be determined based on the position of the face of each occupant. The occupant detector 63 extracts a feature amount of the face of each occupant, and identifies the corresponding occupant by referring to the data on feature amounts accumulated in the occupant identification database 57. The occupant detector 63 stores the identified occupant identification information in the storage 53 in association with information on the sitting position.

When the data on the corresponding occupant is not stored in the occupant identification database 57, the occupant detector 63 may execute a process under the assumption that the occupant does not exist in the database, and may store information on the unknown occupant identification information in the storage 53 in association with the information on the sitting position.

Figure 11:
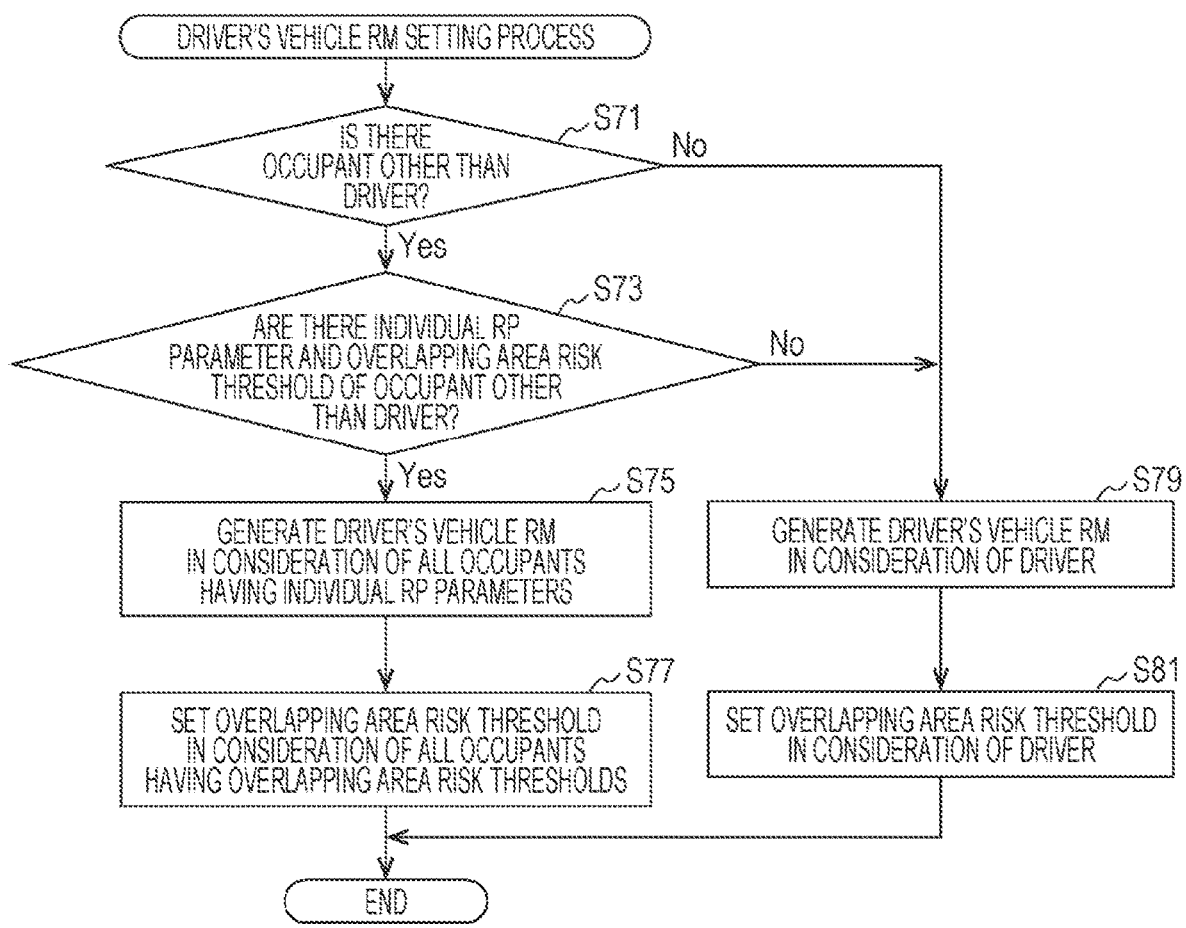
FIG. 11 is a flowchart illustrating an example of a driver's vehicle risk map setting process by the driving assistance device according to the embodiment.

The driver's vehicle risk calculator 69 sets, for the driver's vehicle 1, a driver's vehicle risk map RM_e that reflects individual risk potentials RP_e of the occupants of the driver's vehicle 1 (Step S47). In this embodiment, an overlapping area risk threshold RC_thr is set together with the driver's vehicle risk map RM_e. FIG. 11 is a flowchart illustrating an example of a driver's vehicle risk map setting process.

The driver's vehicle risk calculator 69 determines whether an occupant other than the driver is present (Step S71). For example, the driver's vehicle risk calculator 69 determines whether occupant identification information of an occupant whose sitting position is different from the driver's seat is present based on the data on the pieces of occupant identification information stored in the storage 53.

When determination is made that the occupant other than the driver is not present (S71: No), the driver's vehicle risk calculator 69 generates the driver's vehicle risk map in consideration of the driver (Step S79). In this case, the driver's vehicle risk calculator 69 extracts gradient coefficients $\sigma_x$ and $\sigma_y$ associated with the occupant identification number of the driver from among pieces of learning data on the gradient coefficients $\sigma_x$ and $\sigma_y$ that define the individual risk potentials RP_e stored in the driving characteristic database 55, and sets an individual risk potential RP_e defined by the extracted gradient coefficients $\sigma_x$ and $\sigma_y$ in the driver's vehicle risk map RM_e.

The driver's vehicle risk calculator 69 sets the overlapping area risk threshold RC_thr in consideration of the driver (Step S81). In this case, the driver's vehicle risk calculator 69 extracts an individual overlapping area risk threshold RC_thr_e associated with the occupant identification number of the driver from among pieces of information on the individual overlapping area risk thresholds RC_thr_e stored in the driving characteristic database, and sets the extracted individual overlapping area risk threshold RC_thr_e as the overlapping area risk threshold RC_thr.

When determination is made in Step S71 that the occupant other than the driver is present (S71: Yes), the driver's vehicle risk calculator 69 determines whether learning data on an individual risk potential parameter and an individual overlapping area risk threshold RC_thr_e of this occupant is stored in the driving characteristic database 55 (Step S73). When determination is made that the learning data is not stored in the driving characteristic database 55 (S73: No), the driver's vehicle risk calculator 69 proceeds to Step S79 to execute the processes for setting the driver's vehicle risk map RM_e and the overlapping area risk threshold RC_thr in consideration of the driver.

When determination is made that the learning data is stored in the driving characteristic database 55 (S73: Yes), the driver's vehicle risk calculator 69 generates the driver's vehicle risk map RM_e in consideration of all the occupants having individual risk potential parameters (Step S75).

Figure 12:
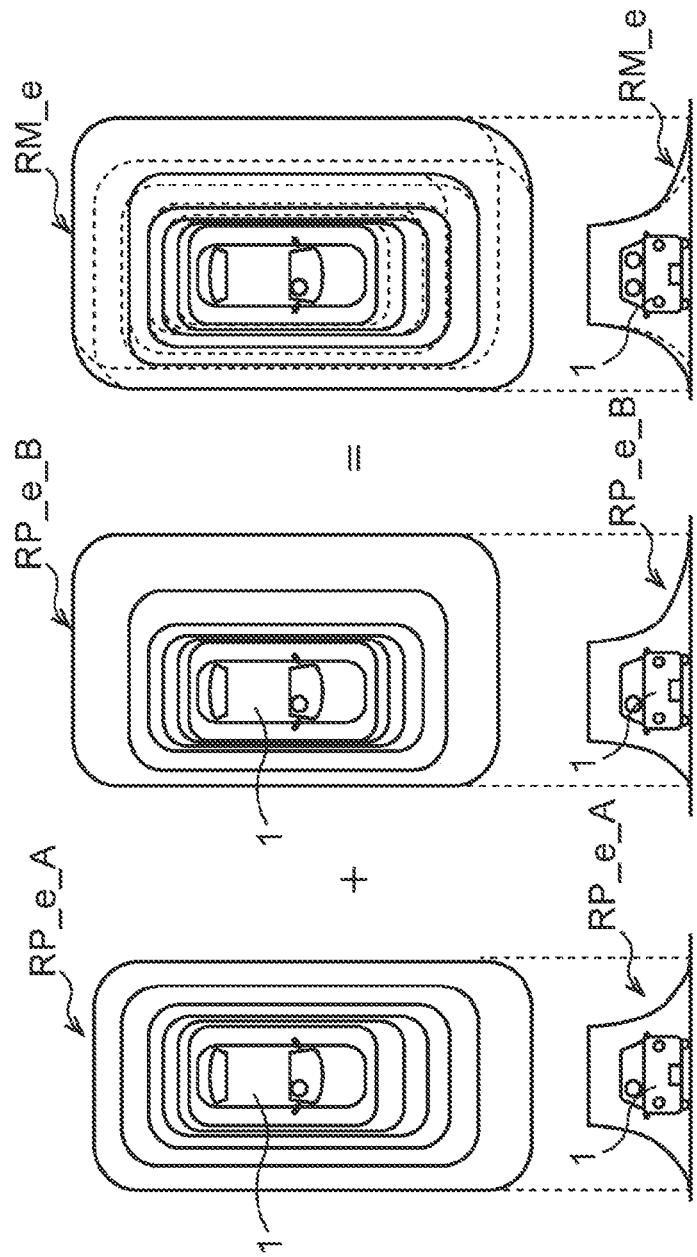
FIG. 12 is an explanatory diagram illustrating an example of a driver's vehicle risk map generated by reflecting individual risk potentials of a plurality of occupants.

FIG. 12 is an explanatory diagram illustrating an example of the driver's vehicle risk map RM_e generated in consideration of the plurality of occupants. FIG. 12 illustrates a driver's vehicle risk map RM_e generated by an overlap of the individual risk potential RP_e_A of the driver A and the individual risk potential RP_e_B of the driver B in FIG. 9. In the example illustrated in FIG. 12, the driver's vehicle risk calculator 69 causes the individual risk potential RP_e_A of the driver A to overlap the individual risk potential RP_e_B of the driver B, and selects any maximum value at each coordinate point. Gradients of the driver's vehicle risk map RM_e on the driver's seat side and the front side of the driver's vehicle 1 are determined by the gradients of the individual risk potential RP_e_A of the driver A, and gradients of the driver's vehicle risk map RM_e on the passenger's seat side and the rear side of the driver's vehicle 1 are determined by the gradients of the individual risk potential RP_e_B of the driver B. Thus, the driver's vehicle risk map RM_e is set while covering all the collision risks sensed by the plurality of occupants depending on the distance from the outer peripheral edge of the driver's vehicle 1.

Although FIG. 12 illustrates the example of the driver's vehicle risk map RM_e that reflects the individual risk potentials RP_e of the two occupants, the driver's vehicle risk calculator 69 generates the driver's vehicle risk map RM_e by an overlap of a plurality of individual risk potentials RP_e also in a case of three or more occupants.

After the driver's vehicle risk map RM_e is generated in Step S75, the driver's vehicle risk calculator 69 sets the overlapping area risk threshold RC_thr in consideration of all the occupants having individual overlapping area risk thresholds RC_thr_e (Step S77). In this embodiment, the driver's vehicle risk calculator 69 sets, as the overlapping area risk threshold RC_thr, an individual overlapping area risk threshold RC_thr_e having the smallest value among the individual overlapping area risk thresholds RC_thr_e of the occupants. The overlapping area risk threshold RC_thr may be set by a different method. For example, an average of the individual overlapping area risk thresholds RC_thr_e of the occupants may be set as the overlapping area risk threshold RC_thr.

As described above, when the occupant of the driver's vehicle 1 is the driver, the driver's vehicle risk calculator 69 sets the individual risk potential RP_e and the individual overlapping area risk threshold RC_thr_e of the driver as the driver's vehicle risk map RM_e and the overlapping area risk threshold RC_thr, respectively. When the occupants of the driver's vehicle 1 include the occupant other than the driver, the driver's vehicle risk calculator 69 sets the driver's vehicle risk map RM_e and the overlapping area risk threshold RC_thr based on the learning data on the individual risk potentials RP_e and the individual overlapping area risk thresholds RC_thr_e of the occupants in the driving characteristic database 55. Thus, it is possible to obtain the driver's vehicle risk map RM_e and the overlapping area risk threshold RC_thr that reflect the collision risks sensed by the occupants of the driver's vehicle 1 depending on the distance from the outer peripheral edge of the driver's vehicle 1.

Figure 13:
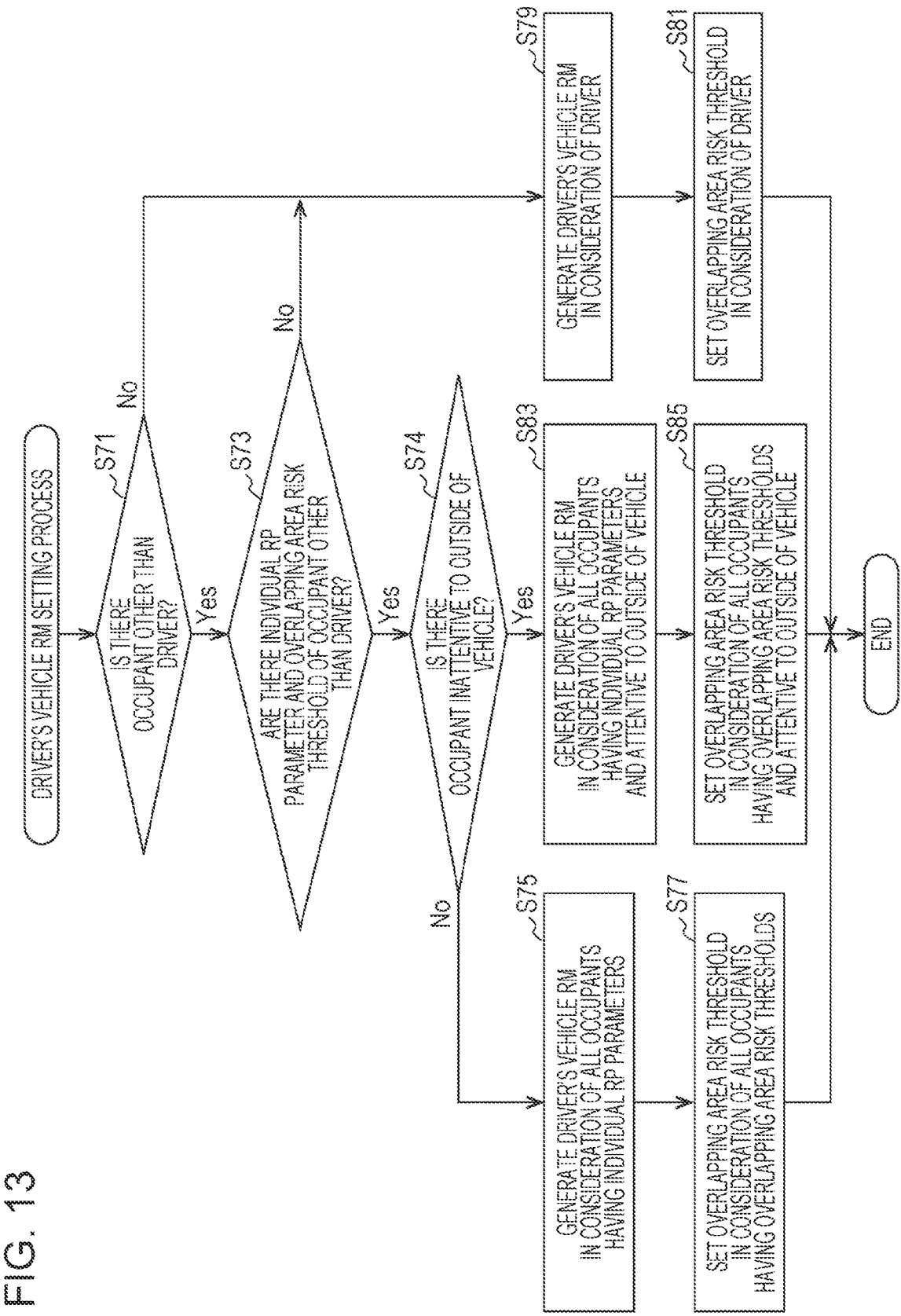
FIG. 13 is a flowchart illustrating another example of the driver's vehicle risk map setting process by the driving assistance device according to the embodiment.

FIG. 13 is a flowchart illustrating another example of the driver's vehicle risk map setting process. In the example illustrated in FIG. 13, the driver's vehicle risk map RM_e and the overlapping area risk threshold RC_thr are set without consideration of occupants inattentive to the outside of the vehicle though the driving characteristic database 55 stores the learning data on the individual risk potential parameters and the individual overlapping area risk thresholds RC_thr_e of the occupants.

For example, when determination is made in Step S73 that the learning data of the occupant other than the driver is stored in the driving characteristic database 55 similarly to the flowchart of FIG. 11 (S73: Yes), the driver's vehicle risk calculator 69 determines whether an occupant inattentive to the outside of the vehicle is present (Step S74). For example, the driver's vehicle risk calculator 69 acquires information on either one of line-of-sight directions and face directions of the occupants detected by the occupant detector 63, and determines whether the occupants are attentive to the outside of the vehicle based on either one of the line-of-sight directions and the face directions. For example, the driver's vehicle risk calculator 69 may determine that the occupants are inattentive to the outside of the vehicle when either one of the line-of-sight directions and the face directions are not forward directions of the driver's vehicle 1 for a preset period or longer.

Through the determination process described above, it is possible to distinguish occupants inattentive to the obstacle, such as a drowsy occupant, an occupant viewing either one of a mobile terminal and an on-board display, or an occupant looking away for a long period.

When determination is made that the occupant inattentive to the outside of the vehicle is not present (S74: No), the driver's vehicle risk calculator 69 generates the driver's vehicle risk map RM_e and sets the overlapping area risk threshold RC_thr in consideration of all the occupants having the learning data on the individual risk potential parameters and the individual overlapping area risk thresholds RC_thr_e through procedures similar to those of Step S75 and Step S77 in the flowchart of FIG. 11.

When determination is made that the occupant inattentive to the outside of the vehicle is present (S74: Yes), the driver's vehicle risk calculator 69 generates the driver's vehicle risk map RM_e in consideration of all the occupants having the learning data on the individual risk potential parameters in the driving characteristic database 55 and attentive to the outside of the vehicle (Step S83). The driver's vehicle risk calculator sets the overlapping area risk threshold RC_thr in consideration of all the occupants having the learning data on the individual overlapping area risk thresholds RC_thr_e in the driving characteristic database 55 and attentive to the outside of the vehicle (Step S85). The processes for generating the driver's vehicle risk map RM_e and setting the overlapping area risk threshold RC_thr are executed similarly to either one of Steps S75 and S77 and Steps S79 and S81.

As described above, when the occupant inattentive to the outside of the vehicle is present, the driver's vehicle risk calculator 69 sets the driver's vehicle risk map RM_e and the overlapping area risk threshold RC_thr without consideration of this occupant. Thus, it is possible to obtain the driver's vehicle risk map RM_e and the overlapping area risk threshold RC_thr that reflect the obstacle collision risks that may be sensed by the occupants attentive to the outside of the vehicle depending on the distance from the outer peripheral edge of the driver's vehicle 1.

In the examples illustrated in FIG. 11 and FIG. 13, when an occupant detected by the occupant detector 63 does not have the learning data on the individual risk potential parameter and the individual overlapping area risk threshold RC_thr_e in the driving characteristic database 55, a preset substitute value of the individual risk potential parameter and a preset substitute value of the individual overlapping area risk threshold RC_thr_e may be applied to this occupant instead of excluding information of the occupant from the consideration. For example, the substitute values may be averages of the individual risk potential parameters and the individual overlapping area risk thresholds RC_thr_e stored in the driving characteristic database 55. Alternatively, the substitute values may be values of an individual risk potential parameter and an individual overlapping area risk threshold RC_thr_e calculated in advance while assuming either one of a skilled model driver and a virtual standard driver.

The driver's vehicle risk calculator 69 may generate the driver's vehicle risk map RM while correcting the individual risk potential RP_e of each detected occupant based on the sitting position of the occupant. For example, the individual risk potential parameter is data learned while each occupant sits on the driver's seat. The range of the blind area for the occupant may vary depending on the sitting position of the occupant. Therefore, the variation in the range of the blind area due to the difference in the sitting position of the occupant may be reflected in the individual risk potential RP_e to change the lateral or longitudinal distribution of the individual risk potential RP_e.

Figure 14:
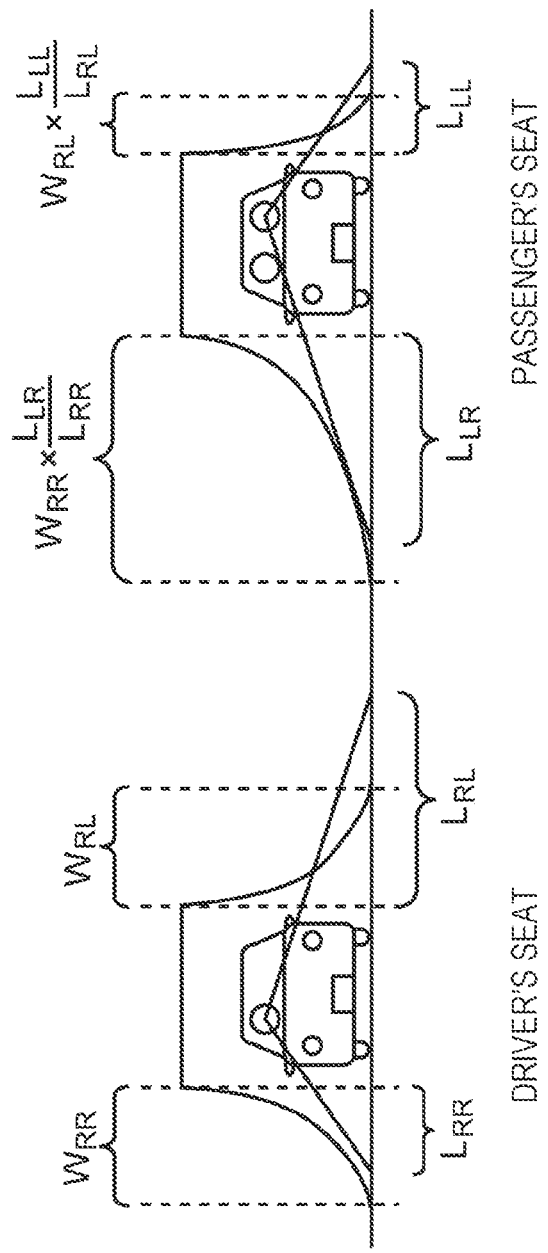
FIG. 14 is an explanatory diagram illustrating a method for correcting an individual risk potential of an occupant on a passenger's seat.

FIG. 14 is an explanatory diagram illustrating a method for correcting the individual risk potential RP_e of an occupant on the passenger's seat. For example, it is assumed that the right and left distributions of the individual risk potential RP_e learned during the manual driving of the driver's vehicle 1 for an occupant on the driver's seat (driver) are equal to each other (see the left part of FIG. 14).

In this case, the right and left widths of the individual risk potential RP_e from the outer peripheral edge of the driver's vehicle 1 are equal to each other ($W_{RR}=W_{RL}$) When viewed from the driver's seat, a width $L_{RR}$ of a blind area on the right side (driver's seat side) of the driver's vehicle 1 is smaller than a width $L_{RL}$ of a blind area on the left side (passenger's seat side) of the driver's vehicle 1.

When the occupant sits on the passenger's seat, the right and left widths of the individual risk potential RP_e are corrected by the ratios of the widths of the blind areas in consideration of the variations in the ranges of the blind areas (see the right part of FIG. 14). For example, when the occupant sits on the passenger's seat, the width $W_{RR}$ of the individual risk potential RP_e on the right side (driver's seat side) of the driver's vehicle 1 is multiplied by an increase ratio ($L_{LR}/L_{RR}$) of the widths of the blind area to increase the width $W_{RR}$ of the individual risk potential RP_e on the right side (driver's seat side) of the driver's vehicle 1. The width $W_{RL}$ of the individual risk potential RP_e on the left side (passenger's seat side) of the driver's vehicle 1 is multiplied by an increase ratio ($L_{LL}/L_{RL}$) of the widths of the blind area to reduce the width $W_{RL}$ of the individual risk potential RP_e on the left side (passenger's seat side) of the driver's vehicle 1. In this case, the values of the widths $L_{RR}$, $L_{RL}$, $L_{LR}$, and $L_{LL}$ of the blind areas may be preset values, and may be set based on pre-input information on the height of the occupant and the position of either one of the face and the eyes of the occupant detected by the occupant detector 63.

Figure 15:
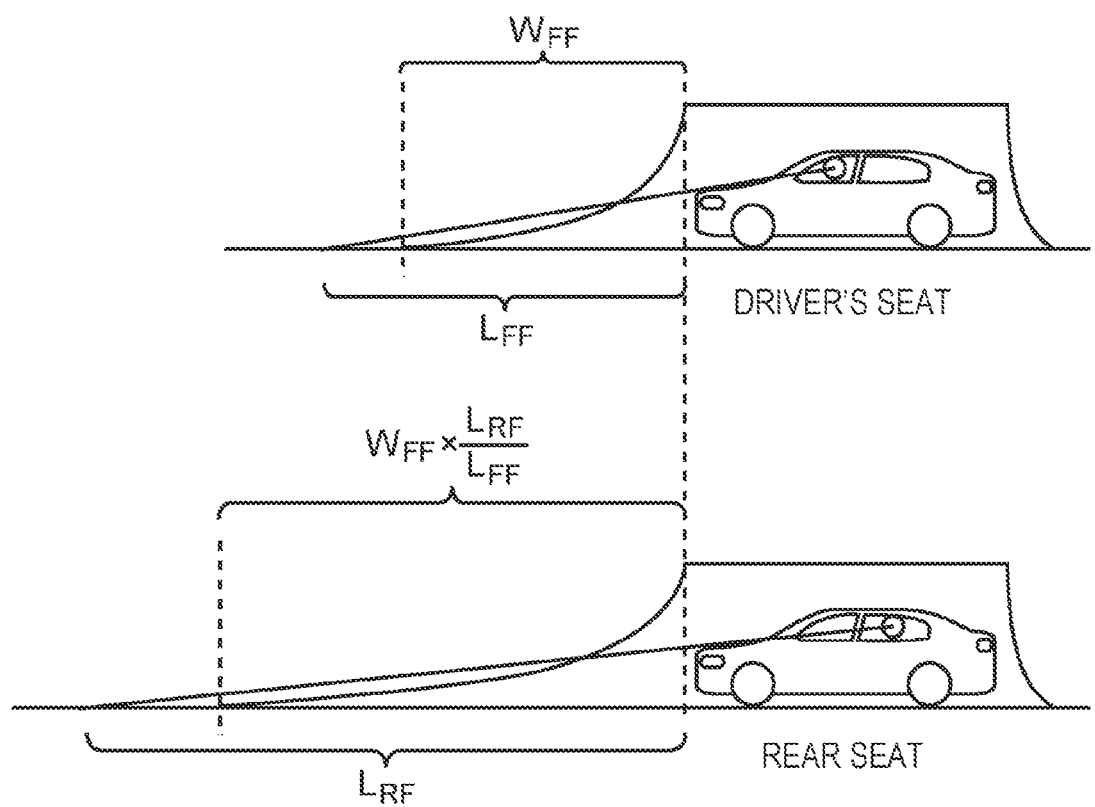
FIG. 15 is an explanatory diagram illustrating a method for correcting an individual risk potential of an occupant on a rear seat.

FIG. 15 is an explanatory diagram illustrating a method for correcting the individual risk potential RP_e of an occupant on the rear seat. A width $L_{FF}$ of a blind area on the front side of the driver's vehicle 1 when viewed from the driver's seat is smaller than a width $L_{RF}$ of the blind area on the front side of the driver's vehicle 1 when viewed from the rear seat. When the occupant sits on the rear seat, the front width of the individual risk potential RP_e is corrected by the ratio of the widths of the blind area in consideration of the variation in the range of the blind area (see the lower part of FIG. 15). For example, when the occupant sits on the rear seat, a front width $W_{FF}$ of the individual risk potential RP_e learned while the occupant sits on the driver's seat is multiplied by an increase ratio ($L_{RF}/L_{FF}$) of the widths of the blind area to increase the width $W_{FF}$ of the individual risk potential RP_e on the front side of the driver's vehicle 1. In this case, the values of the widths $L_{RF}$ and $L_{FF}$ of the blind area may be preset values, and may be set based on the pre-input information on the height of the occupant and the position of either one of the face and the eyes of the occupant detected by the occupant detector 63.

As described above, the variation in the range of the blind area due to the difference in the sitting position of the occupant is reflected in the individual risk potential RP_e to change the lateral or longitudinal distribution of the individual risk potential RP_e. Therefore, the width of the individual risk potential RP_e can be increased or reduced along with either one of the expansion and the contraction of the range of the blind area of the individual risk potential RP_e depending on the sitting position. Thus, the driver's vehicle risk calculator 69 can generate the driver's vehicle risk map RM_e by using the individual risk potential RP_e in which the variation due to the difference in the sitting position is taken into consideration for the collision risk sensed by each occupant depending on the distance from the outer peripheral edge of the driver's vehicle 1.

Referring back to FIG. 10, after the driver's vehicle risk map RM_e is set in Step S47, the surrounding environment detector 61 acquires surrounding environment information of the driver's vehicle 1 through a procedure similar to that of Step S17 in the flowchart of FIG. 5 (Step S49). The surrounding environment detector 61 stores the acquired surrounding environment information in the storage 53.

The driving condition setter 71 determines whether an obstacle to steer around is present on a traveling trajectory of the driver's vehicle 1 through a procedure similar to that of Step S19 in the flowchart of FIG. 5 (Step S51). When determination is made that the obstacle to steer around is not present on the traveling trajectory of the driver's vehicle 1 (S51: No), the controller 51 returns to Step S49 repeat the processes for detecting the surrounding environment information and determining the presence or absence of the obstacle.

When determination is made that the obstacle to steer around is present on the traveling trajectory of the driver's vehicle 1 (S51: Yes), the driving condition setter 71 updates the obstacle risk map through a procedure similar to that of Step S21 in the flowchart of FIG. 5 (Step S53).

The driving condition setter 71 sets a target trajectory ($x_{mr}(t_k)$ $y_{mr}(t_k)$) on which the overlapping area risk RC is minimum based on information on the obstacle risk map and information on the driver's vehicle risk map RM_e (Step S55). For example, the driving condition setter 71 calculates overlapping area risks RC in a case of causing the driver's vehicle 1 to travel along expected traveling trajectories set on an obstacle risk map obtained by an overlap of obstacle risk potentials RPi set for obstacles, and calculates an expected traveling trajectory on which the overlapping area risk RC is minimum (see FIG. 8). For example, the driving condition setter 71 calculates overlapping area risks RC of an overlapping area between the obstacle risk map and the driver's vehicle risk map RM_e that reflects the driving characteristic of the occupant of the driver's vehicle 1 based on Expression (6) for a plurality of settable expected traveling trajectories, and determines an expected traveling trajectory ($x_{mr}(t_k)$, $y_{mr}(t_k)$) on which the overlapping area risk RC is minimum. The driving condition setter 71 sets, as the target trajectory ($x_{mr}(t_k)$, $y_{mr}(t_k)$), the expected traveling trajectory ($x_{mr}(t_k)$, $y_{mr}(t_k)$) on which the overlapping area risk RC is minimum.

Figure 16:
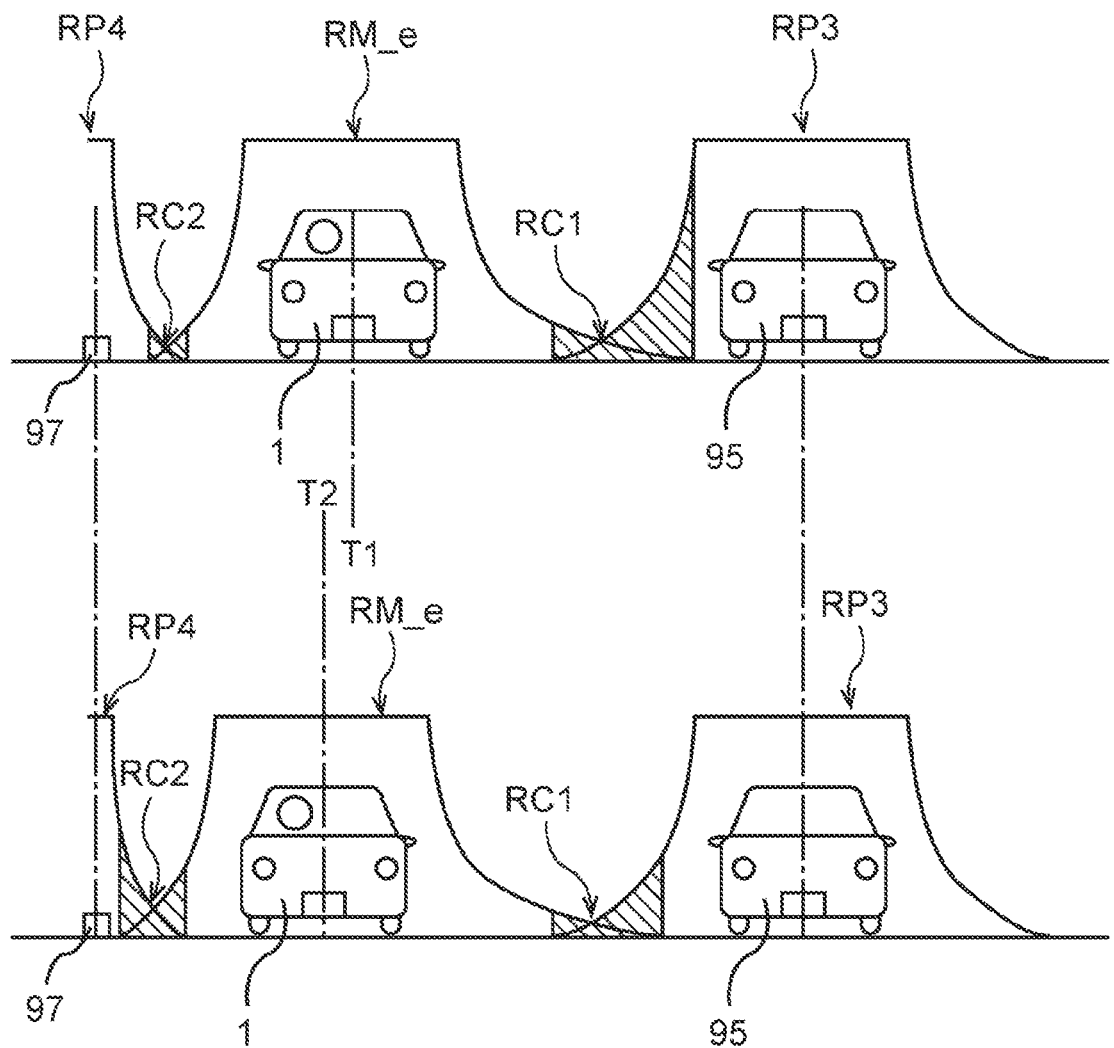
FIG. 16 is an explanatory diagram illustrating a change in the overlapping area risk due to a difference in traveling trajectories.

FIG. 16 is an explanatory diagram illustrating a change in the overlapping area risk RC due to a difference in the traveling trajectories. FIG. 16 illustrates an example of a traveling scene in which the driver's vehicle 1 passes by a parked vehicle 95 parked on a left side of a road. A curbstone 97 is present at the right edge of the road. A traveling trajectory T2 is set closer to the curbstone 97 than is a traveling trajectory T1. In FIG. 16, the maximum values of an obstacle risk potential RP3 of the parked vehicle 95 and an obstacle risk potential RP4 of the curbstone 97 are "1".

In this traveling scene, the overlapping area risk RC is the sum of an overlapping area risk RC1 of an overlapping area between the driver's vehicle risk map RM_e and the obstacle risk potential RP3 of the parked vehicle 95 and an overlapping area risk RC2 of an overlapping area between the driver's vehicle risk map RM_e and the obstacle risk potential RP4 of the curbstone 97. When the traveling trajectory T2 relatively close to the curbstone 97 is set, the value of the overlapping area risk RC1 decreases but the value of the overlapping area risk RC2 increases compared with a case where the traveling trajectory T1 is set. A traveling trajectory on which the total overlapping area risk RC is minimum is calculated based on Expression (6).

The driving condition setter 71 sets a target vehicle speed at which the overlapping area risk RC is equal to or lower than the overlapping area risk threshold RC_thr (Step S57). For example, when the minimum overlapping area risk RC calculated in Step S55 is higher than the overlapping area risk threshold RC_thr, the driving condition setter 71 calculates a target vehicle speed after deceleration by using Expressions (6) and (7) based on a value of a difference between the overlapping area risk RC and the overlapping area risk threshold RC_thr. For example, the driving condition setter 71 calculates a vehicle speed v at which the overlapping area risk RC is equal to the overlapping area risk threshold RC_thr by using, as the risk value $R_e(X_t(t_k), Y(t_k))$ in Expression (6), a risk value $R_e$ (x, y, v) obtained by inputting a value of a settable vehicle speed v after deceleration as the vehicle speed $v_{mr}$ in Expression (7). The driving condition setter 71 sets the calculated vehicle speed v as the target vehicle speed $v_{mr}$.

Figure 17:
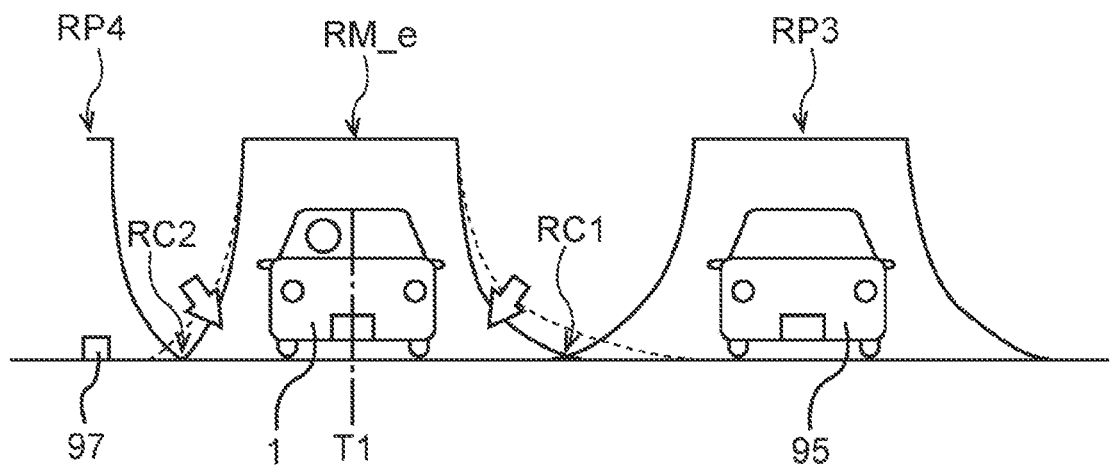
FIG. 17 is an explanatory diagram illustrating how the overlapping area risk decreases in response to a decrease in a vehicle speed.

FIG. 17 is an explanatory diagram illustrating how the overlapping area risk RC decreases by changing the range of the driver's vehicle risk map RM in response to a decrease in the vehicle speed. When the risk value $R_e$ of the driver's vehicle risk map RM is set based on Expression (7), the risk value $R_e$ around the area where the driver's vehicle 1 is present ($R_e$=1) decreases as the vehicle speed decreases. Even when the traveling trajectory T1 illustrated in FIG. 16 is set, the overlapping area risk RC decreases. By reducing the vehicle speed, the driving condition setter 71 can set the target vehicle speed $v_{mr}$ at which the overlapping area risk RC is equal to or lower than the overlapping area risk threshold RC_thr.

The driving condition setter 71 of the controller 51 sets driving conditions of the autonomous driving control on the vehicle 1 based on information on the set target trajectory and the set target vehicle speed (Step S59). For example, the driving condition setter 71 sets a target steering angle based on the target trajectory, and sets either one of a target acceleration and a target deceleration based on the target vehicle speed. The driving condition setter 71 transmits information on the set target steering angle and either one of the set target acceleration and the set target deceleration to the vehicle control device 41. The vehicle control device 41 that has received the information on the target steering angle and either one of the target acceleration and the target deceleration controls traveling of the driver's vehicle 1 by setting target control amounts of, for example, the electric steering device, the braking device, and the drive source based on the received information.

The driving condition setter 71 determines whether the driver's vehicle 1 has steered around the obstacle on the traveling trajectory through a procedure similar to that of Step S25 in the flowchart of FIG. 5 (Step S61). When determination is made that the driver's vehicle 1 has not steered around the obstacle on the traveling trajectory (S61: No), the driving condition setter 71 returns to Step S53 to repeat the processes for updating the obstacle risk map in conjunction with the traveling of the driver's vehicle 1, setting the target trajectory and the target vehicle speed of the driver's vehicle 1, and setting and transmitting the driving conditions.

When determination is made that the driver's vehicle 1 has steered around the obstacle on the traveling trajectory (S61: Yes), the driving condition setter 71 determines whether the on-board system has been stopped (Step S63). When the on-board system has been stopped (S63: Yes), the driving condition setting process by the controller 51 is terminated. When the on-board system has not been stopped (S63: No), the controller 51 returns to Step S43 to repeat the processes of the steps described above.

As described above, during the autonomous driving of the driver's vehicle 1, the controller 51 generates the driver's vehicle risk map that reflects the individual risk potential parameters of the occupants that are learned during the manual driving. The controller 51 sets, as the target trajectory, the expected traveling trajectory on which the overlapping area risk is minimum. The overlapping area risk is the risk value of the overlapping area between the generated driver's vehicle risk map and the obstacle risk map that reflects the obstacle risk potentials set for the obstacles around the driver's vehicle 1. Thus, it is possible to reduce anxiety and discomfort of not only the driver but also the other occupants of the driver's vehicle 1 about the obstacles.

4. Summary

As described above, during the manual driving of the driver's vehicle 1, the driving assistance device 50 according to this embodiment learns the individual risk potential RP_e of each driver, and stores the individual risk potential RP_e in the driving characteristic database 55. During the autonomous driving of the driver's vehicle 1, the driving assistance device 50 sets, for the driver's vehicle 1, the driver's vehicle risk map RM_e that reflects the learned individual risk potentials RP_e of the occupants of the driver's vehicle 1, and sets the driving conditions of the driver's vehicle 1 based on the information on the driver's vehicle risk map RM_e and the information on the obstacle risk map that reflects the obstacle risk potentials RPi set for the obstacles around the driver's vehicle 1. Therefore, anxiety and discomfort of the occupants can be reduced by setting the target trajectory and the target vehicle speed of the driver's vehicle 1 to reduce not only the collision risk from the obstacles but also the collision risk sensed by the occupants depending on the distance from the outer peripheral edge of the driver's vehicle 1.

When a plurality of occupants are present in the driver's vehicle 1 during the autonomous driving of the driver's vehicle 1, the driving assistance device 50 according to this embodiment generates the driver's vehicle risk map RM_e that reflects the information on the individual risk potentials RP_e of the occupants. Therefore, the driving conditions can be set to reduce anxiety and discomfort of the occupants other than the driver.

When a plurality of occupants are present in the driver's vehicle 1 during the autonomous driving of the driver's vehicle 1, the driving assistance device 50 according to this embodiment sets the driver's vehicle risk map RM_e by setting, among the individual risk potentials RP_e of the occupants at each coordinate position in the two-dimensional coordinate system including the plane defined by the longitudinal direction and the lateral direction of the driver's vehicle 1, the maximum value as the risk value $R_e$ at each coordinate position. Therefore, the driver's vehicle risk map RM_e can be generated while being adapted to the occupant who senses the risk most in each direction from the driver's vehicle 1.

The driving assistance device 50 according to this embodiment calculates the overlapping area risks RC that are the risk values of the overlapping area between the obstacle risk map and the driver's vehicle risk map RM_e in the case of causing the driver's vehicle 1 to travel along the expected traveling trajectories, and sets, as the target trajectory, the expected traveling trajectory on which the overlapping area risk RC is minimum. Therefore, the driving conditions can be set to reduce the total risk sensed by the occupants of the driver's vehicle 1.

In the driving assistance device 50 according to this embodiment, the risk value $R_e$ of the individual risk potential RP_e around the area where the driver's vehicle 1 is present decreases as the vehicle speed of the driver's vehicle 1 relatively decreases. The driving characteristic database 55 further stores the information on the individual overlapping area risk threshold RC_thr_e when each driver decelerates the driver's vehicle 1 so that the driver's vehicle 1 passes by the obstacle during the manual driving of the driver's vehicle 1. The driving assistance device 50 sets, as the target vehicle speed, the vehicle speed at which the overlapping area risk RC is equal to or lower than the minimum individual overlapping area risk threshold RC_thr_e among the individual overlapping area risk thresholds RC_thr_e of a plurality of occupants in the driver's vehicle 1. Therefore, anxiety and discomfort can be reduced based on the occupant who may sense the risk most among the occupants of the driver's vehicle 1.

The driving assistance device 50 according to this embodiment corrects the individual risk potential RP_e of each occupant based on the difference in the blind area between the driver's seat and the sitting position of the occupant. Therefore, the driver's vehicle risk map RM_e can be generated by using the individual risk potential RP_e obtained in consideration of the variation due to the difference in the sitting position about the collision risk sensed by each occupant depending on the distance from the outer peripheral edge of the driver's vehicle 1. Thus, it is possible to reduce anxiety and discomfort felt by each occupant depending on the sitting position of the occupant.

The driving assistance device 50 according to this embodiment sets the driver's vehicle risk map RM_e and the overlapping area risk threshold RC_thr while excluding the information on the individual risk potential RP_e of the occupant inattentive to the outside of the vehicle among the plurality of occupants in the driver's vehicle 1. Therefore, it is possible to reduce anxiety and discomfort of the occupant who is attentive to the outside of the vehicle and may sense the obstacle collision risk.

The driving assistance device 50 according to this embodiment includes the individual risk learner 67 that learns the individual risk potential RP_e based on the data related to the distance between the driver's vehicle 1 and the obstacle around the driver's vehicle 1 and acquired during the manual driving. Therefore, the driving characteristic of each driver who has driven the driver's vehicle 1 can be learned without storing a database that accumulates the driving characteristics of the drivers in advance.

Although the exemplary embodiment of the disclosure is described above in detail with reference to the accompanying drawings, the embodiment of the disclosure is not limited to this embodiment. It is understood that various modifications and revisions are conceivable by persons having ordinary skill in the art within the scope of the technical idea in the claims and are included in the technical scope disclosed herein.

For example, the technical scope disclosed herein includes a computer program and a recording medium storing the computer program. The computer program causes the processor of the controller 51 to execute operations including reading the information on the individual risk potential obtained by learning the risk sensed by the driver of the driver's vehicle for the obstacle around the driver's vehicle 1 and set for the driver's vehicle based on the data on the distance between the driver's vehicle 1 and the obstacle that is acquired during the manual driving, setting, for the driver's vehicle, the driver's vehicle risk map that reflects the individual risk potential of the occupant of the driver's vehicle during the autonomous driving of the driver's vehicle, and setting the driving condition for the autonomous driving of the driver's vehicle based on the information on the driver's vehicle risk map and the information on the obstacle risk map that reflects the obstacle risk potential set for the obstacle around the driver's vehicle.

In the embodiment described above, all the functions of the driving assistance device 50 are provided in the driver's vehicle 1. For example, the functions of the driving assistance device 50 may partially be provided in a server communicable via a mobile communicator, and the driving assistance device 50 may exchange data with the server.

The technical scope disclosed herein also includes the following features.

In the driving assistance device of the embodiment described above, when a plurality of occupants are present in the driver's vehicle during the autonomous driving of the driver's vehicle, the driver's vehicle risk calculator sets the driver's vehicle risk map by setting, among the individual risk potentials of the occupants at each coordinate position in the two-dimensional coordinate system including the plane defined by the longitudinal direction and the lateral direction of the driver's vehicle, the maximum value as the risk value at each coordinate position.

In the driving assistance device of the embodiment described above, the risk value of the individual risk potential around the area where the driver's vehicle is present decreases as the vehicle speed of the driver's vehicle relatively decreases. The storage further stores the information on the individual overlapping area risk threshold obtained by calculating the overlapping area risk when the driver decelerates the driver's vehicle so that the driver's vehicle passes by the obstacle during the manual driving. The driving condition setter sets, as the target vehicle speed, the vehicle speed at which the overlapping area risk is equal to or lower than the minimum individual overlapping area risk threshold among the individual overlapping area risk thresholds of the plurality of occupants in the driver's vehicle.

In the embodiment described above, the driving assistance device includes the individual risk learner that learns the individual risk potential that reflects the risk sensed by the driver for the obstacle based on the distance between the driver's vehicle and the obstacle when the driver of the driver's vehicle passes by the obstacle during the manual driving.

The computer program causes the processor to execute operations including reading the information on the individual risk potential set for the driver's vehicle by learning the risk sensed by the driver of the driver's vehicle for the obstacle during the manual driving, setting, for the driver's vehicle, the driver's vehicle risk map that reflects the individual risk potential of the occupant of the driver's vehicle during the autonomous driving of the driver's vehicle, and setting the driving condition for the autonomous driving of the driver's vehicle based on the information on the driver's vehicle risk map and the information on the obstacle risk map that reflects the obstacle risk potential set for the obstacle around the driver's vehicle.

According to the embodiment of the disclosure, the driving condition can be set to reduce anxiety and discomfort of all the occupants during the driving assistance control for steering around the obstacle by the autonomous driving.

The controller 51 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller including the surrounding environment detector 61, the occupant detector 63, the traveling condition detector 65, the individual risk learner 67, the driver's vehicle risk calculator 69, and the driving condition setter 71. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A driving assistance device for a vehicle, the driving assistance device comprising:
    a storage that stores information on an individual risk potential to be set for the vehicle by learning a risk to be sensed by a driver of the vehicle for each of one or more obstacles around the vehicle during manual driving;
    a vehicle risk calculator that sets, for the vehicle, a vehicle risk map that reflects the individual risk potential of an occupant of the vehicle during autonomous driving of the vehicle;
    driving condition setter that sets:
        a target trajectory and a target vehicle speed based on information on the vehicle risk map and information on an obstacle risk map that reflects an obstacle risk potential to be set for the each of the one or more obstacles; and
        a driving condition for the autonomous driving of the vehicle based on the target trajectory and the target vehicle speed; and
    a vehicle control device that controls the autonomous driving of the vehicle based on the driving condition.

2. The driving assistance device according to claim 1, wherein
    the occupant comprises a plurality of occupants, and
    the vehicle risk calculator sets the vehicle risk map based on information on individual risk potentials of the occupants.

3. The driving assistance device according to claim 2, wherein the driving condition setter that:
    calculates an overlapping area risk that is a risk value of an overlapping area between the obstacle risk map and the vehicle risk map in a case of causing the vehicle to travel along an expected traveling trajectory; and
    sets, as a target trajectory, the expected traveling trajectory on which the overlapping area risk is minimum.

4. The driving assistance device according to claim 3, wherein the vehicle risk calculator sets the vehicle risk map while excluding information on the individual risk potential of one or more occupants among the occupants, the one or more occupants being inattentive to an outside of the vehicle.

5. The driving assistance device according to claim 2, wherein the vehicle risk calculator corrects each of the individual risk potentials of the occupants based on a difference in a blind area between a driver's seat of the vehicle and a sitting position of a corresponding one of the occupants.

6. The driving assistance device according to claim 5, wherein the vehicle risk calculator sets the vehicle risk map while excluding information on the individual risk potential of one or more occupants among the occupants, the one or more occupants being inattentive to an outside of the vehicle.

7. The driving assistance device according to claim 2, wherein the vehicle risk calculator sets the vehicle risk map while excluding information on the individual risk potential of one or more occupants among the occupants, the one or more occupants being inattentive to an outside of the vehicle.

8. The driving assistance device according to claim 1, wherein the driving condition setter that:
    calculates an overlapping area risk that is a risk value of an overlapping area between the obstacle risk map and the vehicle risk map in a case of causing the vehicle to travel along an expected traveling trajectory; and
    sets, as a target trajectory, the expected traveling trajectory on which the overlapping area risk is minimum.

9. The driving assistance device according to claim 8,
    wherein the occupant comprises a plurality of occupants, and
    wherein the vehicle risk calculator corrects each of individual risk potentials of the occupants based on a difference in a blind area between a driver's seat of the vehicle and a sitting position of a corresponding one of the occupants.

10. The driving assistance device according to claim 1, wherein the vehicle risk calculator corrects the individual risk potential of the occupant based on a difference in a blind area between a driver's seat of the vehicle and a sitting position of the occupant.

11. A non-transitory tangible machine-readable recording medium storing a computer program that causes a processor to execute operations, the operations comprising:
    reading information on an individual risk potential to be set for a vehicle by learning a risk to be sensed by a driver who drives the vehicle for each of one or more obstacles around the vehicle during manual driving of the vehicle;
    setting, for the vehicle, a vehicle risk map that reflects the individual risk potential of an occupant of the vehicle during autonomous driving of the vehicle;
    setting a target trajectory and a target vehicle speed based on information on the vehicle risk map and information on an obstacle risk map that reflects an obstacle risk potential to be set for the each of the one or more obstacles;
    setting a driving condition for the autonomous driving of the vehicle based on the target trajectory and the target vehicle speed; and
    controlling the autonomous driving of the vehicle based on the driving condition.

12. A driving assistance device for a vehicle, the driving assistance device comprising:
    a storage that stores information on an individual risk potential to be set for the vehicle by learning a risk to be sensed by a driver of the vehicle for each of one or more obstacles around the vehicle during manual driving; and
    circuitry that:
        sets, for the vehicle, a vehicle risk map that reflects the individual risk potential of an occupant of the vehicle during autonomous driving of the vehicle;
        sets a target trajectory and a target vehicle speed based on information on the vehicle risk map and information on an obstacle risk map that reflects an obstacle risk potential to be set for the each of the one or more obstacles;

sets a driving condition for the autonomous driving of the vehicle based on the target trajectory and the target vehicle speed; and controls the autonomous driving of the vehicle based on the driving condition.

\* \* \* \* \*